US008112384B2

(12) United States Patent
Mitra et al.

(10) Patent No.: US 8,112,384 B2
(45) Date of Patent: Feb. 7, 2012

(54) SYSTEM AND METHOD FOR PROBLEM SOLVING THROUGH DYNAMIC/INTERACTIVE CONCEPT-MAPPING

(75) Inventors: Ambar K. Mitra, Ames, IA (US); Abhijit Chandra, Ames, IA (US); Craig D. Herreman, Tucson, AZ (US); Joel P. Dunham, Bettendorf, IA (US)

(73) Assignee: Actus Potentia, Inc., Ames, IA (US)

( * ) Notice: Subject to any disclaimer, the term of this patent is extended or adjusted under 35 U.S.C. 154(b) by 297 days.

(21) Appl. No.: 11/259,171

(22) Filed: Oct. 25, 2005

(65) Prior Publication Data

US 2006/0095474 A1    May 4, 2006

Related U.S. Application Data

(60) Provisional application No. 60/622,933, filed on Oct. 27, 2004.

(51) Int. Cl.
*G06F 17/00* (2006.01)

(52) U.S. Cl. ............................. 707/603; 706/45

(58) Field of Classification Search ............... 707/101, 707/999.101, 603, 794; 706/45
See application file for complete search history.

(56) References Cited

U.S. PATENT DOCUMENTS

| 271,749 | A | * | 2/1883 | Stewart | 434/192 |
| 5,835,758 | A | * | 11/1998 | Nochur et al. | 707/102 |
| 5,870,731 | A | * | 2/1999 | Trif et al. | 706/52 |
| 5,881,243 | A | * | 3/1999 | Zaumen et al. | 709/241 |
| 6,112,049 | A | | 8/2000 | Sonnenfeld | |
| 6,513,042 | B1 | | 1/2003 | Anderson et al. | |
| 6,871,182 | B1 | * | 3/2005 | Winnard et al. | 705/7 |
| 2002/0049689 | A1 | * | 4/2002 | Venkatram | 706/45 |
| 2004/0143561 | A1 | * | 7/2004 | Jensen et al. | 706/46 |

OTHER PUBLICATIONS

Boisvert et al., Interactive and Dynamic Content in Software Repositories, Feb. 26, 1997.*
Casanova et al., NetSolve: A Network Server for Solving Computational Science Problems, Apr. 26, 1996.*
Plötzner et al., Model-based Design of Activity Spaces for Collaborative Problem Solving and Learning, 1996, pp. 1-9.*
Kinshuk et al., "Intelligent Tutoring for Cognitive Skill Acquisition in Life Long Learning", 2000.*
Stevens et al., "Design and Performance Frameworks for Constructing Problem-Solving Simulations", 2003.*

(Continued)

*Primary Examiner* — Shahid Alam
*Assistant Examiner* — Dawaune Conyers
(74) *Attorney, Agent, or Firm* — Charles A. Lemaire; Lemaire Patent Law Firm, P.L.L.C.

(57) ABSTRACT

The present invention provides a computer-implemented method of problem solving that includes graphically displaying a plurality of concepts, dynamic links between the concepts, and solving a problem based on the displayed concepts and dynamic links. Other embodiments include: a computer-readable medium having instructions thereon for causing a suitably programmed information-processing apparatus to perform a method of the problem solving that includes graphically displaying a plurality of concepts, displaying dynamic links between the concepts, and solving a problem based on the displayed concepts and dynamic links. Still other embodiments include a computerized apparatus that includes a display output unit, a display drive unit that causes a plurality of concepts to be displayed on the display unit, and that causes dynamic links between the concepts to be displayed, and a solution unit that solves a problem based on the displayed concepts and dynamic links, and that displays the solution.

32 Claims, 24 Drawing Sheets

OTHER PUBLICATIONS

Hsu et al. (Implementing a Problem Solving System for Physics based on Knowledge Map and Four Steps Problems Solving Strategies, 2002, IEEE).*

Horst Schecker (Learning physics by making models, 1993, Phys. Educ.).*

Gertner et al., "Andes: A Coached Problem Solving Environment for Physics", 2000, Intelligent Tutoring Systems, pp. 133-142.*

Gertner et al., "Procedural help in Andes: Generating hints using a Bayesian network student model", 1998, AAAI.*

Fung et al., "On Developing Case-Based Tutorial Systems with Conceptual Graphs", 1999, Lecture Notes in Computer Science.*

Gertner et al., "Providing feedback to equation entries in an intelligent tutoring system for Physics", Aug. 1998.*

Ausubel, David P., "Educational Psychology. A Cognitive View", (1968).

Ausubel, David P., "The Psychology of Meaningful Verbal Learning", (1963).

Buzan, Tony, et al., "The Mind Map Book. How to Use Radiant Thinking to Maximize Your Brain's Untapped Potential", (1993).

Novak, Joseph, "Clarify with Concept Maps", *The Science Teacher*, (Oct. 1991), 45-49.

Novak, Joseph D., "Concept Maps and Vee diagrams: two metacognitive tools to facilitate meaningful learning", *Instructional Science*, vol. 19, (1990), 29-52.

* cited by examiner

FIG. 11                                                                 1100

Solve Equation

Velocity velocity Kinematics $$\vec{v}_t = \vec{v}_0 + \vec{a} * (t_t - t_0)$$  ~1101

Select one variable per group to solve for:

Give values to known variables

Direction 1

☐ v_t1 - Velocity (final) (direction-1)    = |10|   1102

☐ v_01 - Velocity (initial) (direction-1)  = |5|    1102

1103 ☑ a_1 - Acceleration (direction-1)     = |0|

☐ t_0 - Time (initial)                     = |0|

☐ t_1 - Time (final)                       = |5|

[Solve] ~1104      [Clear Solution] ~1105      [Finished] ~1106

Solution:

Solve Equation

Newton's 2nd Law

A force acting on a body produces acceleration of the body parallel and directly proportional to the force.

$$\vec{F} = m * \vec{a}$$ ~1201

Select one variable per group to solve for:

Give values to known variables

Direction 1

☑ F_1 - Force (direction-1)  = 0
☐ m - mass  1202 = 5
☐ a_1 - Acceleration (direction-1)  1202 = 1

[Solve] ~1204   [Clear Solution] ~1205   [Finished] ~1206

Solution:

SYSTEM AND METHOD FOR PROBLEM SOLVING THROUGH DYNAMIC/INTERACTIVE CONCEPT-MAPPING

RELATED APPLICATIONS

This is a non-provisional application claiming priority to U.S. Provisional Patent Application U.S. 60/622,933 entitled "SYSTEM AND METHOD FOR LEARNING INTERVENTION THROUGH DYNAMIC/INTERACTIVE CONCEPT-MAPPING" which was filed on Oct. 27, 2004, by the inventors of the present invention, which is incorporated by reference in its entirety.

FIELD OF THE INVENTIONS

This invention relates to the field of software, and more specifically to a system and method for teaching problem solving through dynamic/interactive concept-mapping.

BACKGROUND OF THE INVENTION

In today's world, the Knowledge Economy as we know it is rapidly being eclipsed by something new—which may be called the Creativity Economy. What was once central to corporations—price, quality, and much of the left-brain, digitized analytical work associated with knowledge—is fast being shipped off to lower-paid, highly trained workers in under-developed or developing nations. "Knowledge" or at least its information content is gradually being commoditized.

To survive in this global marketplace, the smart companies increasingly focus on creativity. It isn't just about what you know or the analytical skills, but it's what you do with the information available to you. More and more, the global corporations care about creativity, imagination, and, above all innovation. To survive in this environment, corporations like GE™ have revamped the performance metrics for their managers. They have adopted CENCOR (calibrate, explore, create, organize, and realize). The question remains—how to systematically and methodically practice or conform to a metric like CENCOR?

The question is how one prepares to not only survive in this environment, but excel in this global economy. The present invention provides a way to systematically Understand, Organize, and Innovate (UOI). Based on concept mapping principles, the methodology of the present invention aids an individual to hone his/her problem solving skills.

The first step is to understand the problem definition. This is achieved by constructing a dynamic concept map of the problem domain. Next, the concept map is made interactive. This facilitates organization of its information content. In some embodiments, the present invention provides a solution algorithm for the concept map that—presents a set of feasible solutions for the problem at hand. A pareto-optimal solution may then be obtained from this set. Thus, the present design strategy allows smooth transition from the abstract phase to the details phase of a design task, maintaining relevance to the context.

SUMMARY OF THE INVENTION

The present invention provides a computer-implemented method of problem solving that includes graphically displaying a plurality of concepts, dynamic links between the concepts, and solving a problem based on the displayed concepts and dynamic links. Other embodiments include: a computer-readable medium having instructions thereon for causing a suitably programmed information-processing apparatus to perform a method of the problem solving that includes graphically displaying a plurality of concepts, displaying dynamic links between the concepts, and solving a problem based on the displayed concepts and dynamic links. Still other embodiments include a computerized apparatus that includes a display output unit, a display drive unit that causes a plurality of concepts to be displayed on the display unit, and that causes dynamic links between the concepts to be displayed, and a solution unit that solves a problem based on the displayed concepts and dynamic links, and that displays the solution.

In some embodiments, the present invention provides an apparatus and/or a computer-implemented method for problem solving that includes graphically displaying a plurality of concepts, displaying dynamic links between the concepts to form a dynamic concept map, and solving a problem based on the concept map of the displayed concepts and dynamic links.

Some embodiments further include posing a problem using a plurality of nodes in the concept map, selecting at least one input variable from an input variable list, selecting at least one output variable from an output variable list, searching a variable list associated with each of the nodes for each selected input variable, searching a variable list associated with each of the nodes for each selected output variable, identifying one or more nodes that have the input variable as start nodes, identifying one or more nodes that have the output variables as end nodes, determining a shortest path between the start node and the end node, and connecting the start node and end node using a path.

Some embodiments further include computing a cost of the path, and providing a user with a choice to elect the path.

Some embodiments further include determining a feasibility of the path and whether the feasibility is positive or negative, and if the path has a negative feasibility, then eliminating the path from consideration in the determination of the shortest path and iteratively determining a next shortest path.

In some embodiments, the method of problem solving is part of a learning intervention.

Some embodiments further include presenting to a user an initial concept map, creating an added node and adding this node to the concept map based on input from the user, obtaining descriptive information from the user and associating the descriptive information with the added node, and creating a link between the added node and another node.

In some embodiments, the descriptive information includes a node type.

In some embodiments, the descriptive information includes test information.

In some embodiments, the descriptive information includes an input equation.

Some embodiments further include obtaining input from the user designating as to whether a plurality of nodes merge.

Some embodiments further include obtaining input from the user designating a single variable to stand for multiple variables in an input or output list.

In some embodiments, one or more of the methods of the invention are distributed on a computer readable medium.

BRIEF DESCRIPTION OF THE DRAWINGS

FIG. 11 depicts a screen shot 1100 of a pop-up window utilized for solving numerical calculations for a particular node with certain mathematical properties.

FIG. 12 depicts a screen shot 1200 of another pop-up window utilized for solving numerical calculations for a particular node with certain mathematical properties.

FIG. 18 is a screen shot 1800 of a pop-up window with a variety of fields for defining the characteristics of a node.

FIG. 19 depicts a screen shot 1900 of a pop-up window with a variety of text fields, buttons, and drop-down menus for entering and selecting data.

FIG. 21 depicts a screen shot 2100 displaying the path taken for solving or determining the surplus or shortage of wine-grapes.

DESCRIPTION OF EMBODIMENTS

Figure 1:
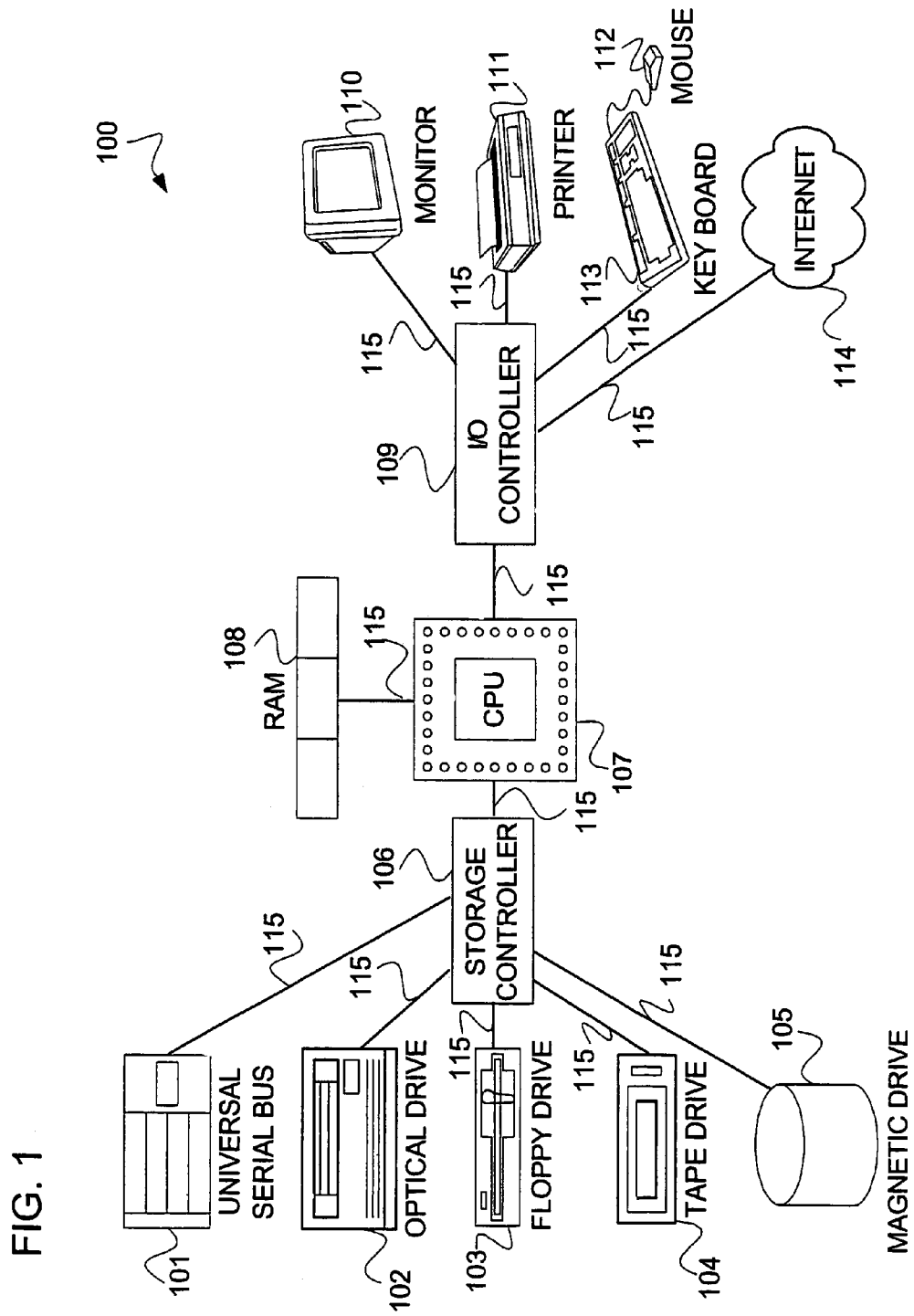
FIG. 1 is a schematic of a computer system 100.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Environments for Some Embodiments

In some embodiments, a digital processing system or computer system includes a processor, which may represent one or more processors and may include one or more conventional types of such processors (e.g., x86, x86-64), such as an AMD processor, or Intel Pentium processor or the like. A memory is coupled to the processor by a bus. The memory may be a dynamic random access memory (DRAM) and/or may include static RAM (SRAM). The processor may also be coupled to other types of storage areas/memories (e.g., cache, Flash memory, disk, etc.), which could be considered as part of the memory or separate from the memory.

The bus further couples the processor to a display controller, a mass memory or some type of computer-readable medium device, the modem or network interface, and an input/output (I/O) controller. Computer-readable medium may include a magnetic, optical, magneto-optical, tape, and/or other type of machine-readable medium/device for storing information. For example, the computer-readable medium may represent a hard disk, a read-only or writeable optical CD, etc. The display controller controls in a conventional manner a display, which may represent a cathode ray tube (CRT) display, a liquid crystal display (LCD), a plasma display, or other type of display device. The I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions which are stored on a computer-readable medium or may be implemented in a combination of software and hardware, or in certain embodiments, entirely in hardware.

Embodiments within the scope of the present invention include a computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage medium such as RAM, ROM, EPROM, CD-ROM or other optical-disk storage, magnetic-disk storage or other magnetic-storage devices, or any other medium which can be used to carry or store desired program code means in the form of computer-executable instructions, computer-readable instructions, or data structures and which may be accessed by a general-purpose or special-purpose computer system. This physical storage medium may be fixed to the computer system as in the case of a magnetic drive or removable as in the case of an EEPROM device (e.g., flash memory device).

Problem Solving

Problem solving is an exercise that can be categorized into the following classes:

Problem solving in education and training in a classroom.

Problem solving for new product or process design in industry.

Problem solving for expansion, reorganization, and planning in business.

The present invention for computerized problem-solving is capable of solving problems belonging to all these three classes.

Problem solving is a process to develop and explore the cause-effect relationships. The causes and effects are variables and their type depends on the area of application. For engineering problems, some typical variables are load, stress, reaction-rate, temperature, etc. For problems in economics or business, some typical variables are equilibrium price, surplus/shortage, revenue, profit, capital expenditure, etc.

These variables are related to each other through established laws and principles, relationships that are derived or obtained from experiments or past experience, and definitions. A few examples are given below:

Laws/principles: Newton's Laws, Le Chatelier's Principle, Law of increasing opportunity cost, etc.

Relationships: Variation of drag coefficient with Reynolds number for a sphere, Supply curve of wine-grapes with rainfall, etc.

Definitions: Definition of kinetic energy, definition of marginal cost, etc.

Henceforth, in this patent application, Laws/principles, relationships, and definitions will be collectively called as Governing Conditions (GC).

The variables in a problem must obey the Governing Conditions of the problem. In a problem, some variables are given and the unknown variables are determined by utilizing the Governing Conditions. One can encounter problems of two kinds:

Direct Problems: The beginning variables are given and the ending variables are computed. The problem-solver simply accepts the values of the ending variables. In other words, the cause is known and the effect is determined.

Inverse Problems: A set of desired ending variables is given and the beginning variables are computed. In other words, the problem-solver wants a desired effect and determines the necessary causes.

The present framework of problem solving does not make any distinction between these two classes. Therefore the present invention can be utilized for solving direct and inverse problems.

Let us now examine the various kinds of complexities involved in the problem solving process.

Complexity-1

Consider a situation controlled by G number of Governing Conditions and containing V number of variables. Out of these variables, (V-G) number of variables are given and the remaining G number of variables are computed by using the G number of Governing Conditions. One can have $$\frac{V!}{(V-G)!G!} \quad \text{Eq. (1)}$$

number of possible types of problems in this situation. Thus, for V=6 and G=2, one can have fifteen different kinds of problems.

The present framework of problem solving contains the appropriate logic to handle any magnitude of Complexity-1.

Complexity-2

Consider a discipline with G number of Governing Conditions. Consider a problem with V number of variables out of which (V-N) variable are given and the remaining N number of variables are obtained by using N number of Governing Conditions where $$N \leq G \quad \text{Eq. (2)}$$

Thus, a problem-solver needs to choose N number of Governing Conditions out of G number of Governing Conditions that are available. The number of ways this choice can be made is $$\frac{G!}{(G-N)!N!} \quad \text{Eq. (3)}$$

The present framework of problem solving contains the appropriate logic to handle any magnitude of Complexity-2.

Complexity-3

Two problems that use the same N number of Governing Conditions may have two completely different solution procedures. This difference arises from the order in which these N Governing Conditions are utilized in the multi-step solution procedure. This process of determining the order is further complicated because all Governing Conditions are not connected to each other. For example, in the area of mechanics, the kinetic energy cannot be directly used in the impulse-momentum principle, but the problem-solver must first use the kinematical principles to derive additional information.

The present framework of problem solving based on concept map is particularly suitable for handling Complexity-3, because the connections among the Governing Conditions are programmed as allowed paths on the map.

Complexity-4

Consider a problem that requires N number of Governing Conditions. However, this does not make the problem-solving an N-step process. In step-1, the problem solver may use the first principle, but in step-2, the problem-solver may need to use second, third, and fourth principles together. The problem-solver must utilize Governing Conditions either singly or collectively in various combinations to solve a problem.

Consider a problem that requires three Governing Conditions for the solution. These three Governing Conditions can be employed in the following possible orders and combinations:

TABLE 1

| |
|---|
| 1 → 2 → 3 |
| 1 → 3 → 2 |
| 2 → 1 → 3 |
| 2 → 3 → 1 |
| 3 → 1 → 2 |
| 3 → 2 → 1 |
| 1 → 2 + 3 |
| 2 + 3 → 1 |
| 2 → 1 + 3 |
| 1 + 3 → 2 |
| 3 → 2 + 1 |
| 2 + 1 → 3 |
| 1 + 2 + 3 | where the "+" sign indicates that two or more Governing Conditions are employed simultaneously.

The present invention of computerized concept mapping contains appropriate algorithm to analyze all of these combinations.

Concept Map

The concept map of this innovation embodies all six steps of Bloom's Taxonomy. The development of the concept map gives the problem solver an opportunity to sharpen his/her knowledge and comprehension. The use of concept map sharpens a user's skill in application, analysis, synthesis, and evaluation.

Development of Concept Map requires:
  Knowledge: Knowledge of major laws, definitions, and relationships to establish the nodes on the concept map.
  Comprehension: Understanding the information so that the causes are grouped and organized to draw the paths on a concept map.
Use of Concept Map sharpens the skills in:
  Application: Use methods and information in new situations and solve problems.
  Analysis: Recognizing patterns and hidden meanings and understanding
  Synthesis: Use old ideas to create new ones, generalize from given facts, predict and draw conclusions.
  Evaluation: Compare ideas and make choices based on arguments with reasoning and result.

A concept map is a wonderful tool that aids in the enhancement of these cognitive processes. The concept map is an outgrowth from the learning psychology of Ausubel (See *The Psychology of Meaningful Verbal Learning*, by D. P. Ausubel, Grune and Stratton, 1963). Also, Ausubel in 1968 (See *Educational Psychology: A Cognitive View*, Holt, by D. P. Ausubel, Rinehart and Winston, 1968.) proposed that cognitive psychology is linked with the assimilation of innovation and existing knowledge. From that perspective, development and use of a concept map can provide a viable basis and springboard to launch the six cognitive processes listed above.

The concept map is a visual presentation and organization of the existing knowledge. The concepts in the domain of knowledge are linked with each other in a network. The large number of pathways along these links enables the problem solver to explore and be creative and to become a creator of knowledge. Furthermore, concept maps have been shown to facilitate meaningful learning, problem solving, and longer periods of retention. (See, e.g., *Vol.* 19 *Concept Maps and Vee Diagrams: Two Metacognitive Tools for Science and Mathematical Education, Instructional Science*, J. D. Novak, 1990; *Vol.* 58(7) *Clarify with Concept Maps, The Science Teacher*, J. D. Novak, 1991.)

The concepts in science, engineering, economics, or business are inter-connected like a system of gears. The natural thought process in the brain is also like a gear system, but we tend to ignore such a wonderful similarity and disrupt the learning and problem solving processes by forcing the brain to think in a linear fashion. Buzan and Buzan (See *The Mind Map Book*, T. Buzan and B. Buzan, Penguin, 1993.) observed that when the brain is allowed to learn in its natural, radiant fashion, several things happen—increased concentration and confidence and no suffering from boredom and frustration.

Figure 2:
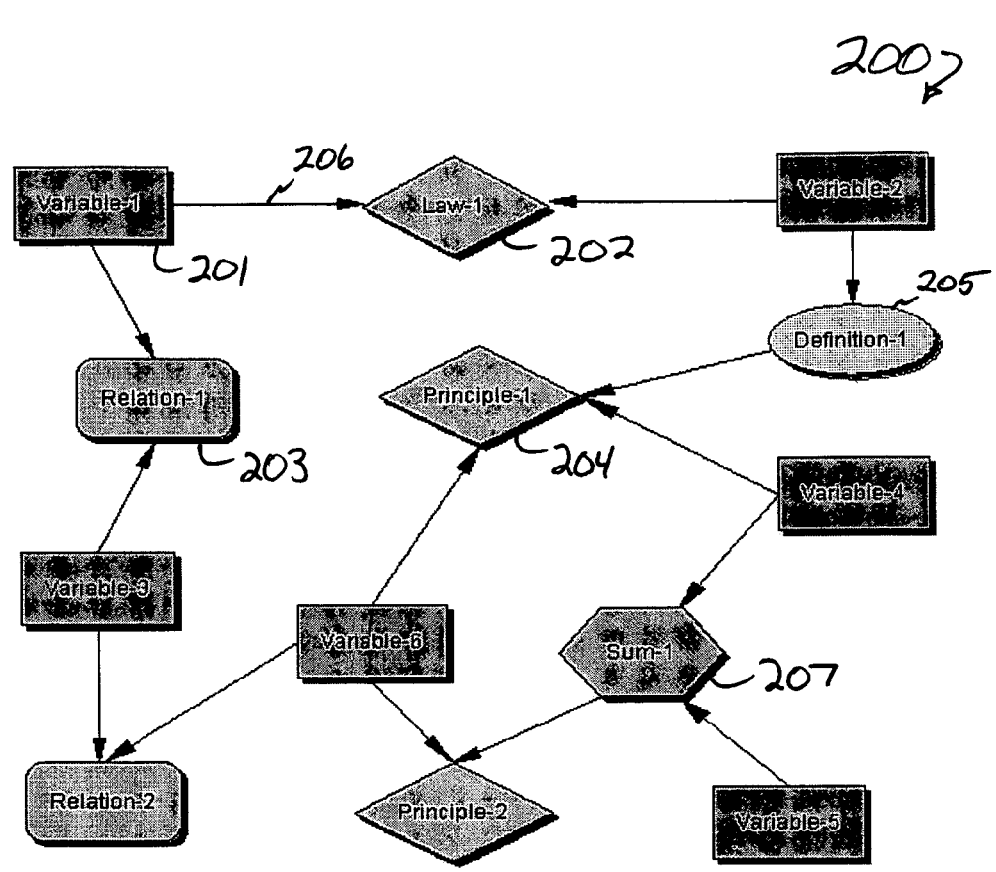
FIG. 2 is a schematic of a concept map 200.

In FIG. 2, a concept map is shown schematically. The concept map is a network of nodes connected by paths. The paths depict the relationships that exist between the variables through laws and principles, derived relationships, definitions, and sum nodes. The sum nodes add up the influences from various sources. For example, in mechanics, the sum node may add up the forces from a spring, a damper, and gravity. In business, the sum node may add up the revenues generated from various divisions of a company.

For many problems, the procedure for the solution may be non-unique. This is true for problems in science and engineering and also for solution of business problems. For problems in science and engineering, the cost of a solution procedure is equivalent to the effort involved. For example, solving a non-linear equation is more difficult compared to solving a linear equation. In business problems, this cost could be in real cash.

In the present invention the cost factor is included in a concept map by associating this cost to each path in the network of paths in the map. Each path on the map may have different cost values.

The concept mapping system of the present invention can operate in two modes.
1. Developer mode: In this mode a problem solver creates a new special purpose concept map.
2. User mode: In this mode a problem-solver solves problem by using an existing concept map.

The Developer mode requires knowledge and comprehension. Exercises in the Developer Mode sharpen the knowledge based and comprehension based skills of the problem solver.

However, a passive and static concept map does not address last four cognitive skills in Bloom's Taxonomy. These four cognitive skills are addressed in the User Mode. To meet this end, the present innovation has three characteristics available in the User Mode: (i) The concept map of the present innovation is dynamic and interactive so that a problem-solver can pose and solve problems. (ii) A problem-solver can insert numerical values for the input variables and determine numerical values for the output variables. (iii) A problem-solver can evaluate the cost and efficiency of a solution procedure.

The concept map has a built-in solver for solving linear and non-linear equations. A problem-solver can use the concept map in application by using numerical values for the variables.

A problem solver can enter sets of test data for the variables and collect the output to analyze the trends and patterns in the relationship among the variables.

From this analysis, a problem solver can synthesize new Governing Conditions that the variables must satisfy.

From the synthesized information, a problem solver can compare, contrast, and evaluate the options in a new scenario.

User Mode of Concept Mapping

The user mode of the system of concept mapping is demonstrated by taking an example from the area of mechanics for sophomore level students in a university.

Figure 3:
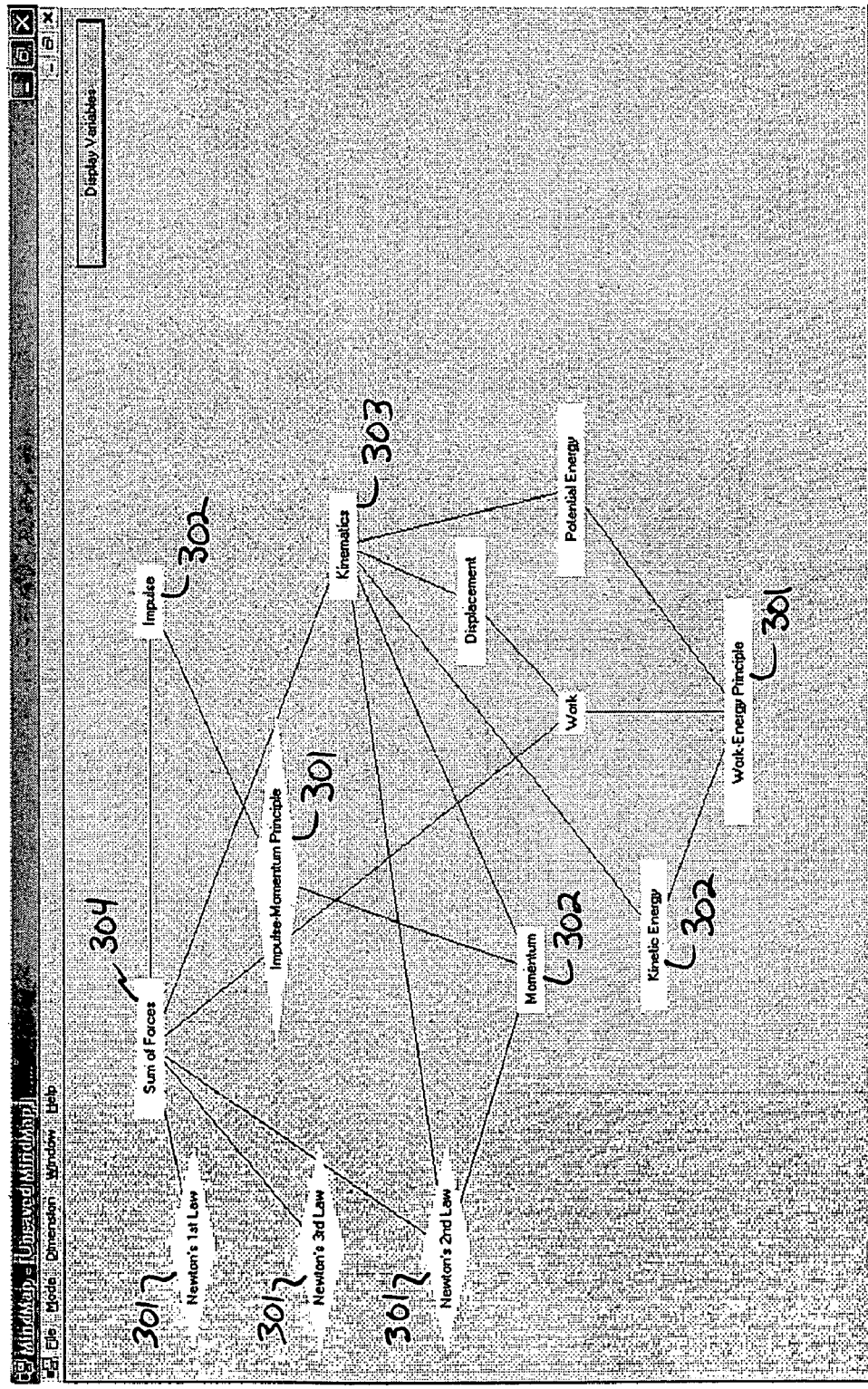
FIG. 3 depicts a screen shot 300 of a concept map.

In FIG. 3, the opening page is shown as the user executes the software. The concept map in this figure contains the following types of nodes:
1. Law/Principle Nodes: Newton's Laws, impulse-momentum principle, and the work-energy principle.
2. Definition Nodes: Momentum, kinetic energy, potential energy, work and impulse.
3. Relation Node: Kinematics
4. Sum Node: Sum of forces The user can use the compact concept map of FIG. 3 or switch to the elaborate concept map of FIG. 4. The elaborate map show more detail, as some nodes are expanded into sub-nodes, and all the inputs to the sum-nodes are shown. Obviously, the elaborate map is more complex with details. However, this map remains available to user if he/she wishes to view the solution path on the detailed concept map.

The use of this map will be demonstrated by solving the following problem:

A 2 KG MASS HAS A VELOCITY OF 5 M/S AT AN INITIAL INSTANT AND 10 M/S AT AN INSTANT 5 S LATER. CALCULATE THE AVERAGE FORCE

THAT IS EMPLOYED ON THIS MASS, DURING THE 5 S TIME INTERVAL.

To pose a problem on this concept map, the user clicks the "Display Variables" button on top right corner of the screen. The input and variables are chosen on the pop-up windows shown in FIG. 8 and FIG. 9.

Figure 8:
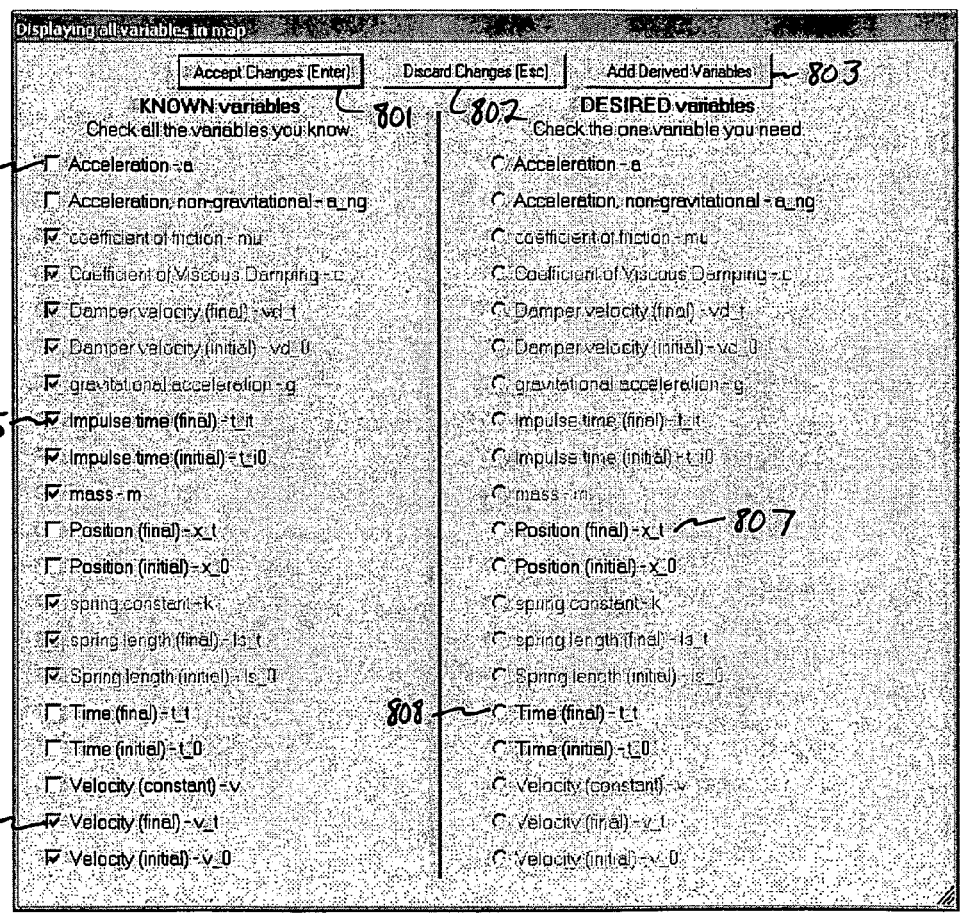
FIG. 8 depicts a screen shot 800 of a collection of input variables used for a particular set of nodes, and more specifically for finding, or solving for, a path between a set of nodes.
Figure 9:
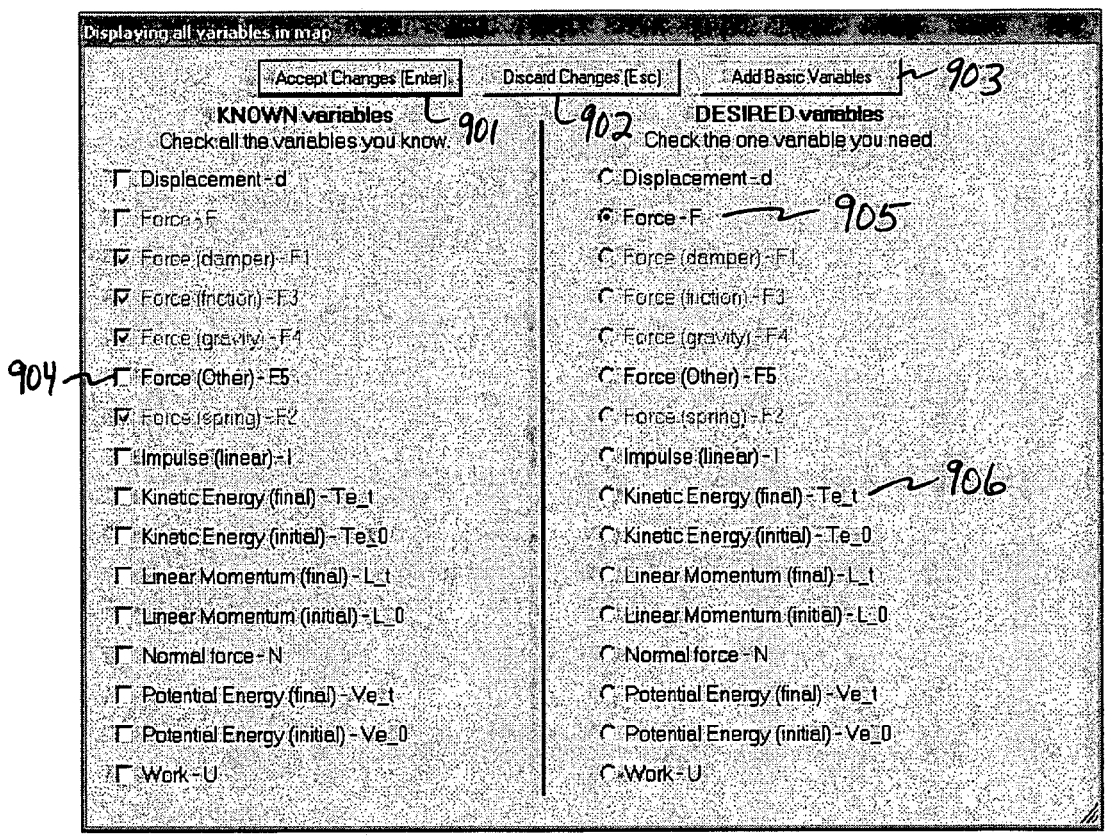
FIG. 9 depicts a screen shot 900 of a collection of output variables used for a particular set of nodes, and, more specifically, for finding, or solving for, a path between a set of nodes.

The window of FIG. 8 is vertically divided into two parts. The user checks the known inputs on the left-hand column and checks the outputs on the right hand column. For the current problem, the user has chosen impulse times, mass, and velocities as input, as seen from the checked boxes in FIG. 8. Also the user wants to determine the force applied on the mass and checks the radio button for force, as shown in FIG. 9.

Figure 10:
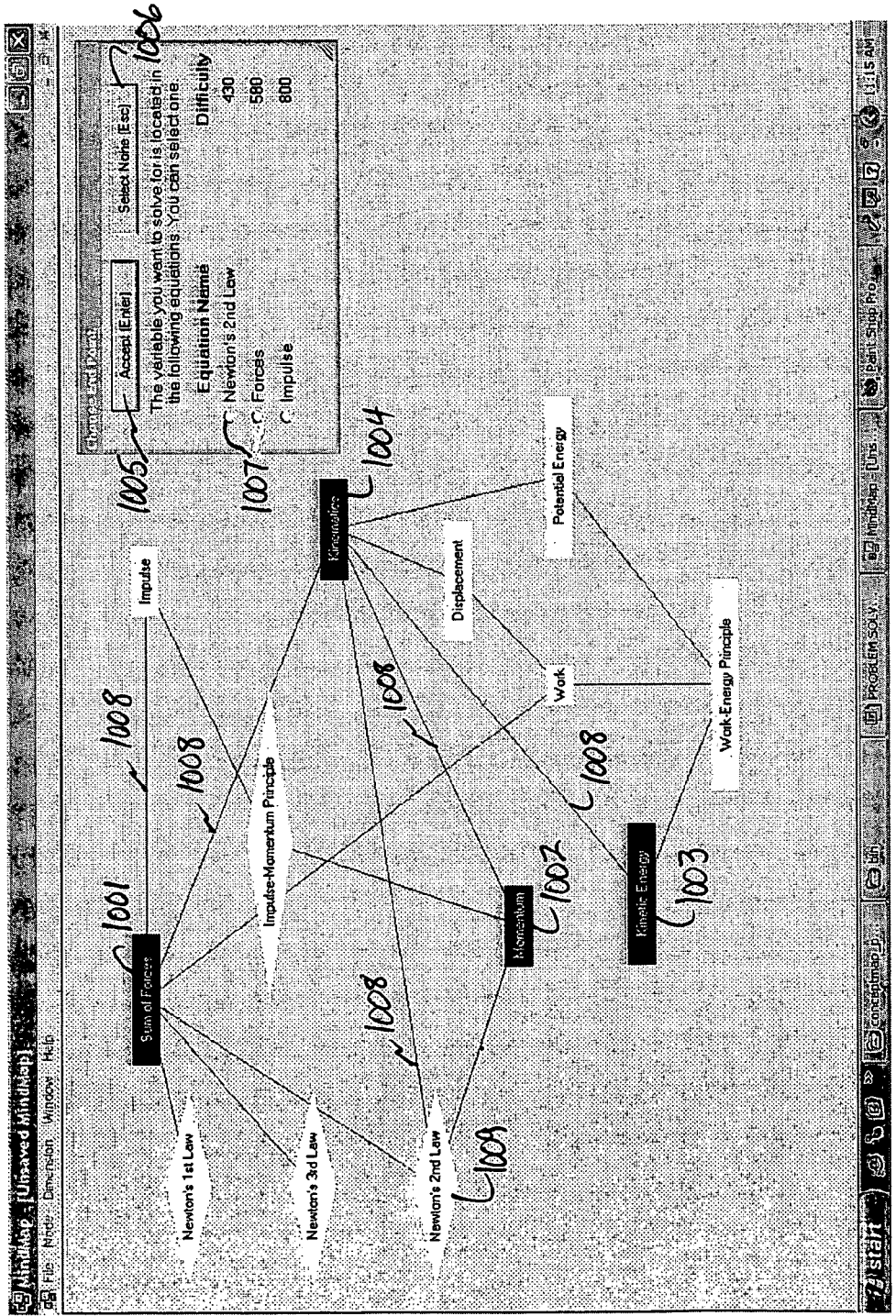
FIG. 10 depicts a screen shot 1000 of the possible start and end nodes of a concept map.

After entering the input and output variables, the user clicks the "Accept Changes" button to obtain the concept map shown in FIG. 10. On this concept map, the possible starting nodes for the solution of this problem are highlighted with green. The possible end points for this problem are shown on a pop-up window at the top right-hand corner. In the present situation:

Possible Start Nodes: Sum of Forces, Kinematics, Kinetic Energy, Momentum

Possible End Nodes: Newton's 2nd Law, Forces, Impulse.

The costs associated with each end node are also shown in the window at top-right. At this stage it is unknown which start-node and end-node combination will solve this problem. Consider that the user has chosen the least expensive end node—"Newton's 2nd Law" and clicked "Accept". The concept map program attempts to solve the problem by searching through the four possible choices—starting a path at each of the start node and ending the path on Newton's 2nd Law.

Figure 7:
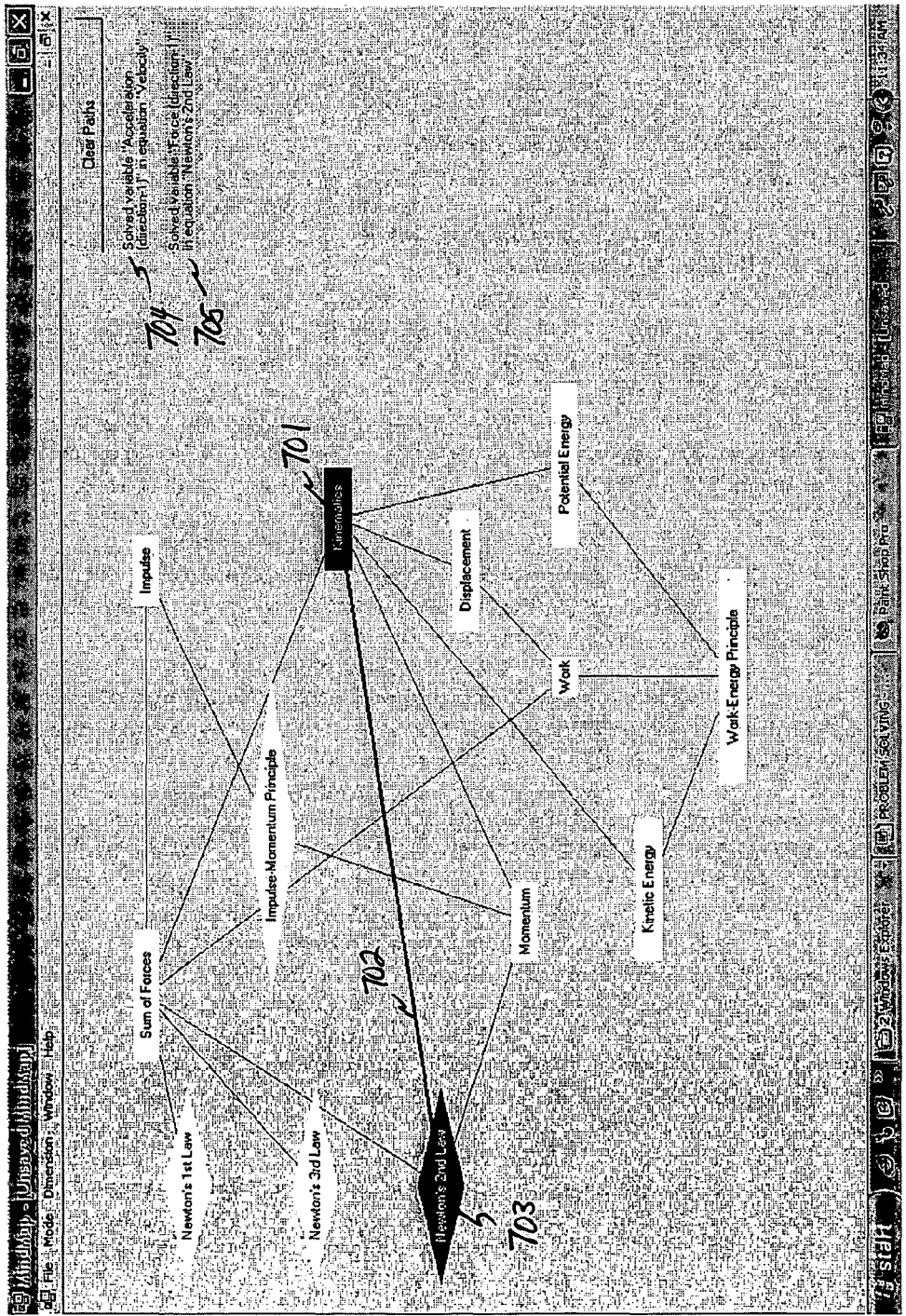
FIG. 7 depicts a screen shot of a concept map 700 with one possible path for a solution.

In this particular situation, for the solution of the problem, the software finds a successful path 702 starting at the Kinematics-node and ending at the Newton's 2nd Law-node, as shown in FIG. 7. In addition, at top right-hand corner, the software gives specific instructions for solving the problem.

The user can then double-click the Kinematics-node to obtain the pop-up window of FIG. 11. On this window, the user can enter the input data as Velocity (final)=10
Velocity (initial)=5
Time (initial)=0
Time (final)=5 to obtain acceleration "a=1".

The user can then double-click the Newton's 2nd Law-node to obtain another pop-up window of FIG. 12. On this window, the user can enter the input data as Mass=5 to obtain force "F=5". Note that the value of "a=1" obtained in the first pop-up window gets automatically transferred to the second pop-up window. This concludes the application part of problem solving.

By entering different values for velocities and mass, the user can further analyze the concepts of Kinematics and Newton's 2nd Law and can discover patterns and hidden meanings to improve the understanding.

In order to synthesize and create new ideas from old ones, the user can go back to the screen of FIG. 10. On this screen, instead of selecting the Newton's 2nd Law-node (which is already explored above), the user can select either the Forces-node or the Impulse-node.

Figure 13:
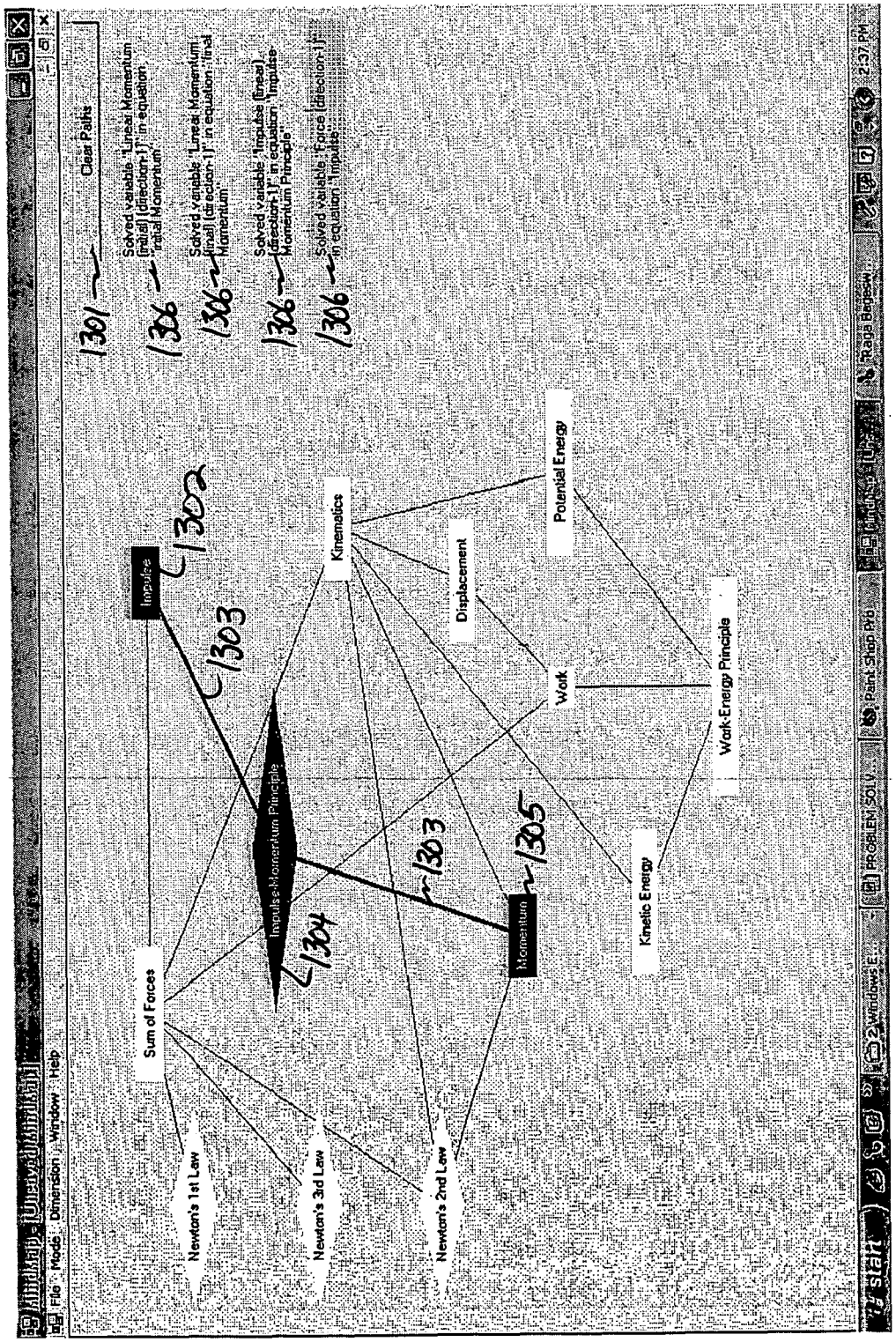
FIG. 13 depicts a screen shot 1300 depicting a solution path between various nodes.

Consider that the user has chosen the Impulse-node to get the screen of FIG. 13. On this screen the user discovers that there is a second method for solving the problem. This new solution method begins at the Momentum-node and ends at the Impulse-node through the Impulse-Momentum Principle-node. By convention, the beginning node is colored green, end node is colored red, and all intermediate nodes are colored blue. The software also gives the instructions for obtaining the solution at top right-hand corner of the screen. By double clicking on the highlighted nodes, the user can now get pop-up windows similar to those shown in FIGS. 11 and 12. On these windows, the user can perform the numerical calculations.

After the two paths to the solution are found and used, the user can compare and discriminate between the two sets of principles and make choices based on reasoned arguments involving the cost. For problems in mechanics, the cost is a measure of the effort expended in obtaining the solution. For business problems the cost has real monetary value.

Developer Mode of Concept Mapping

The functioning of the Developer Mode of the software is demonstrated by considering a very simple problem from economics.

The supply curve of wine-grapes has the equation $$P = 7T_S + I$$

where P is the price per ton, $T_s$ is tons of supply and I is the intercept of the supply curve. Change in I pushes the supply curve up or down and I depends on rainfall according to the equation $$I = \frac{4000}{R}$$

where R is the annual rainfall in inches. The demand curve has the equation $$P = 600 - 11T_D$$

where $T_D$ is the tons of demand. The surplus S of wine-grapes is given by $$S = T_S - T_D$$

(a) Calculate the equilibrium price of wine-grapes when the annual rainfall is 25 inches.
(b) Calculate the surplus/shortage of wine-grapes when the price is fixed at $250 per ton.

Figure 15:
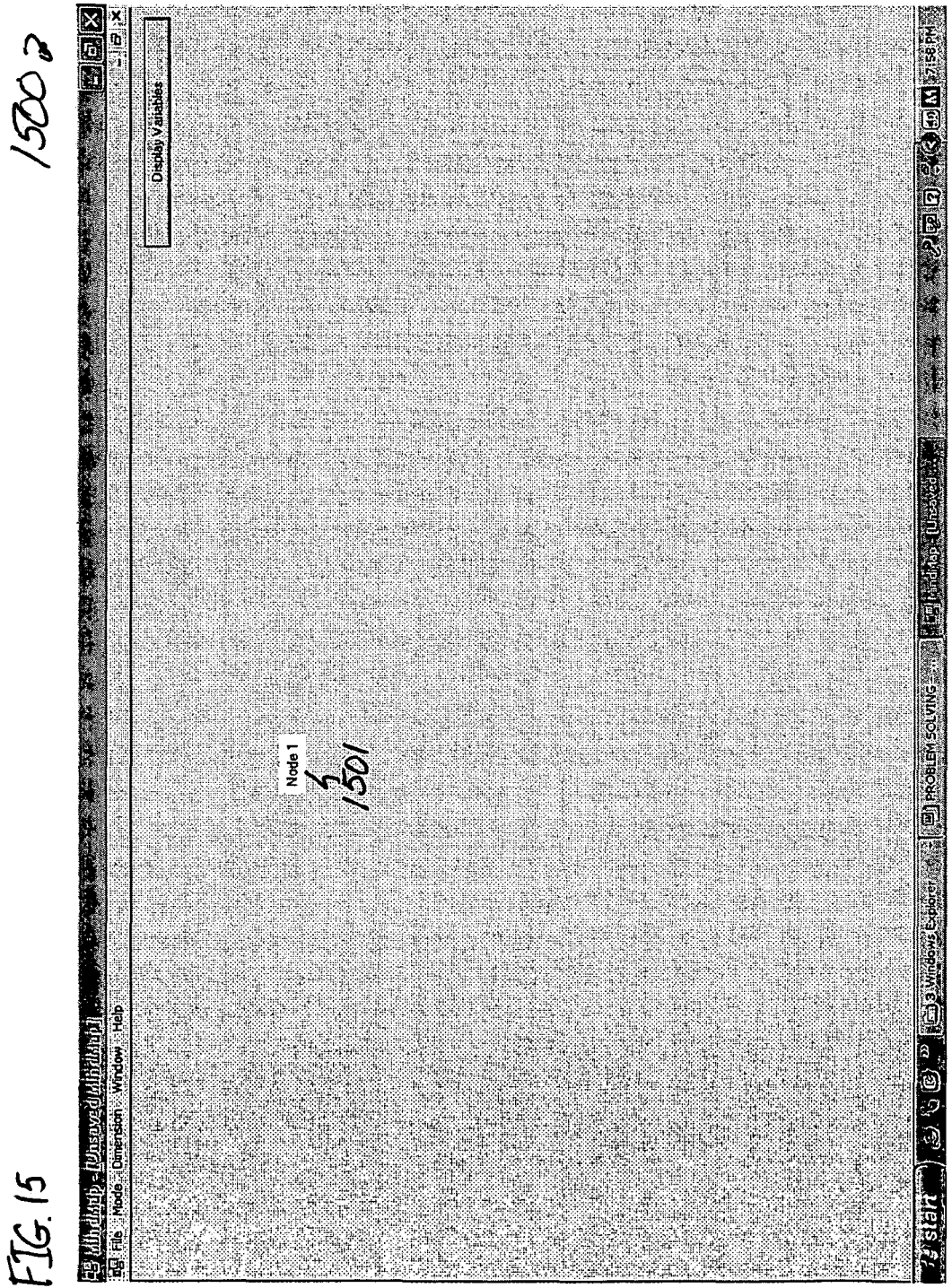
FIG. 15 depicts a screen shot 1500 of work space with an add-node function implemented.

Developer opens the software and selects "New" from the File menu at the tool bar on the top of screen to obtain the screen shown in FIG. 15. The software adds an unlabeled node on the workspace.

Figure 16:
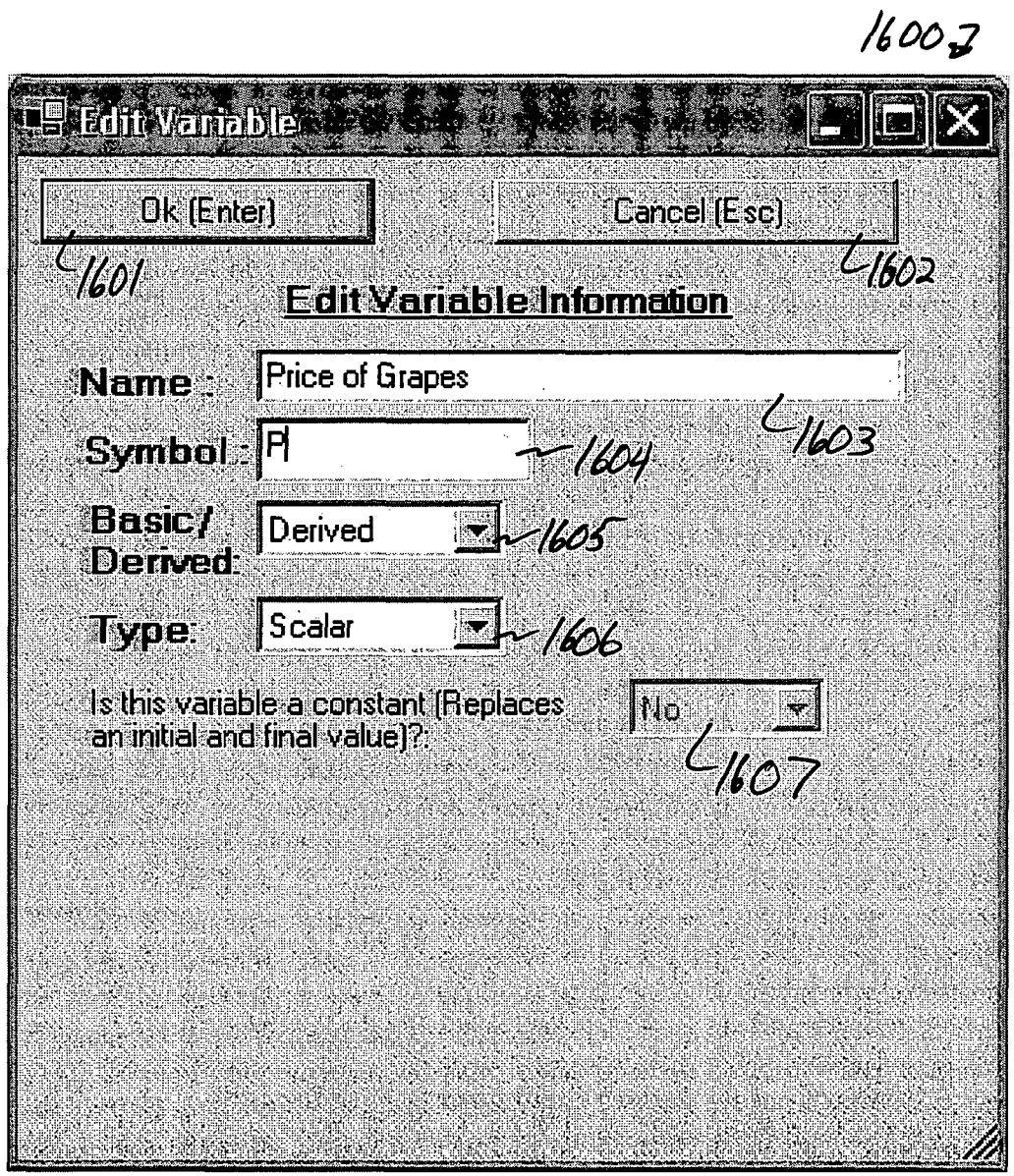
FIG. 16 depicts a screen shot 1600 of a pop-up window used for displaying text boxes on a form into which are inputted the name, symbol, and the type of the variable[s].
Figure 17:
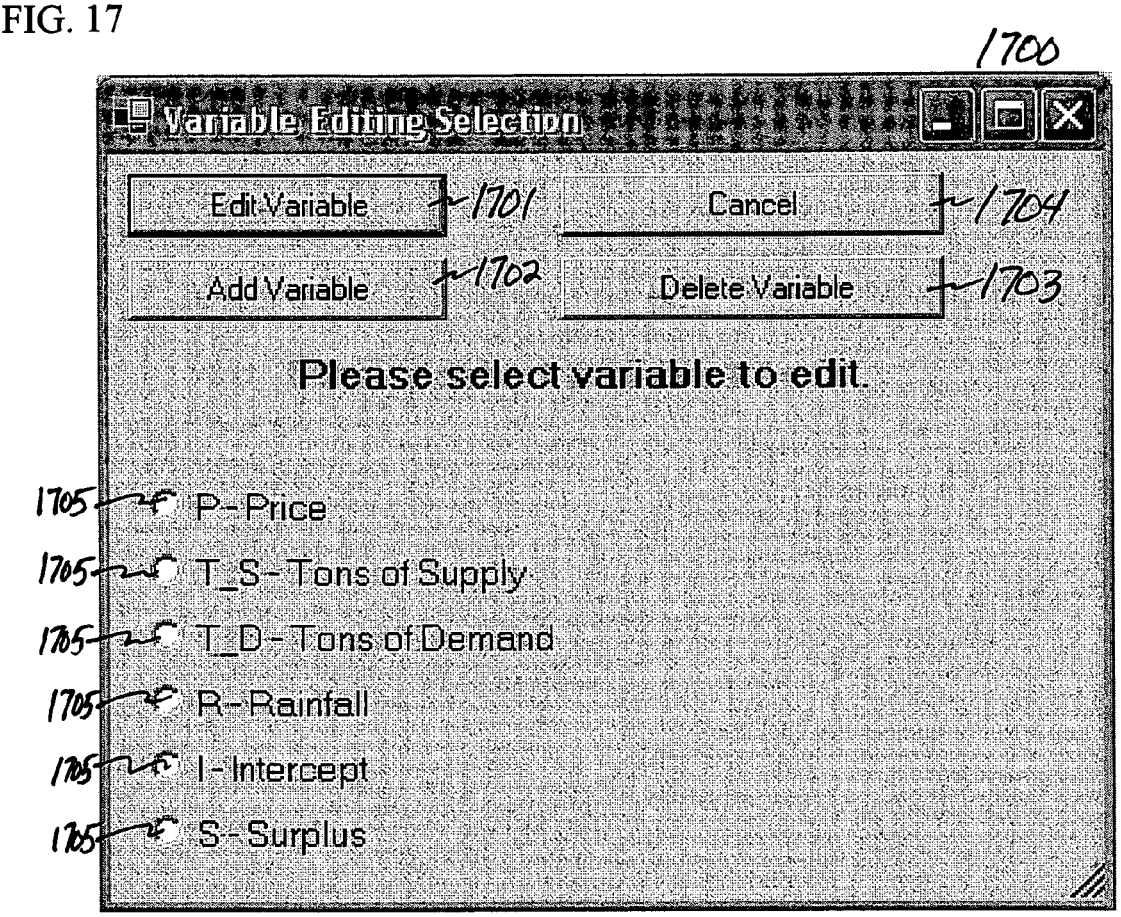
FIG. 17 depicts a screen shot 1700 disclosing a pop-up window with the names of each variable entered for a particular concept map and "radio buttons" corresponding to each of these variables.

In the next step, the user adds all the variables into the concept map. This is done by right-clicking anywhere on the workspace and selecting "Add Variables" from a pop-up menu to obtain the window of FIG. 16. On this window, the user enters the name, symbol, and the type of the variable. In this manner, all the variables in the concept are added into the program database. At the end of the variable addition process, the "Add Variable" appears as shown in FIG. 17.

After all the variables are defined, the developer can define the node properties. By right-clicking on the node of FIG. 15 and selecting Edit on a pop-up menu, the developer can open the node property window of FIG. 18. The developer enters the "Name" of the window as "Rainfall", enters a brief description of this node, and the equation relating rainfall and the intercept of the supply curve.

Figure 19:
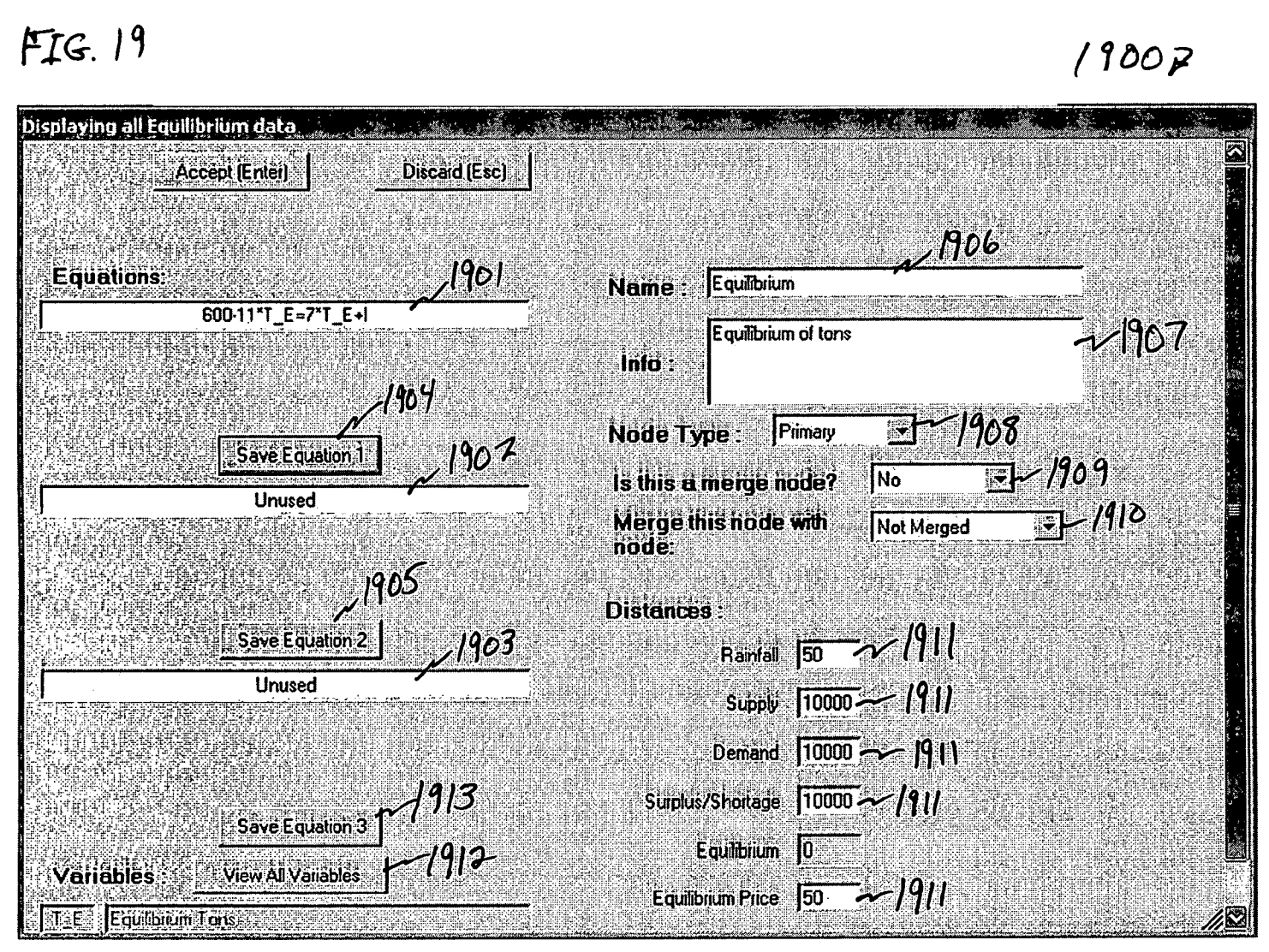

New nodes can be added to the concept map by right-clicking on the workspace and selecting "Add" for a pop-up menu. The node properties can then be specified as described in the previous paragraph. For example, the screen for setting the properties of the Equilibrium node is shown in FIG. 19. On this screen, the equations for supply and demand are entered and are equated to each other to define the equilibrium condition. Note that the distance between the Equilibrium node and the Surplus/Shortage node is specified as 10,000. This signifies that there is no direct path that connects Surplus/Shortage with Equilibrium. Similarly, the distance between Demand node and Equilibrium node is also set to 10,000. Whereas, the distance between Equilibrium and Rainfall is set to 50, signifying existence of a direct path between these nodes.

Figure 20:
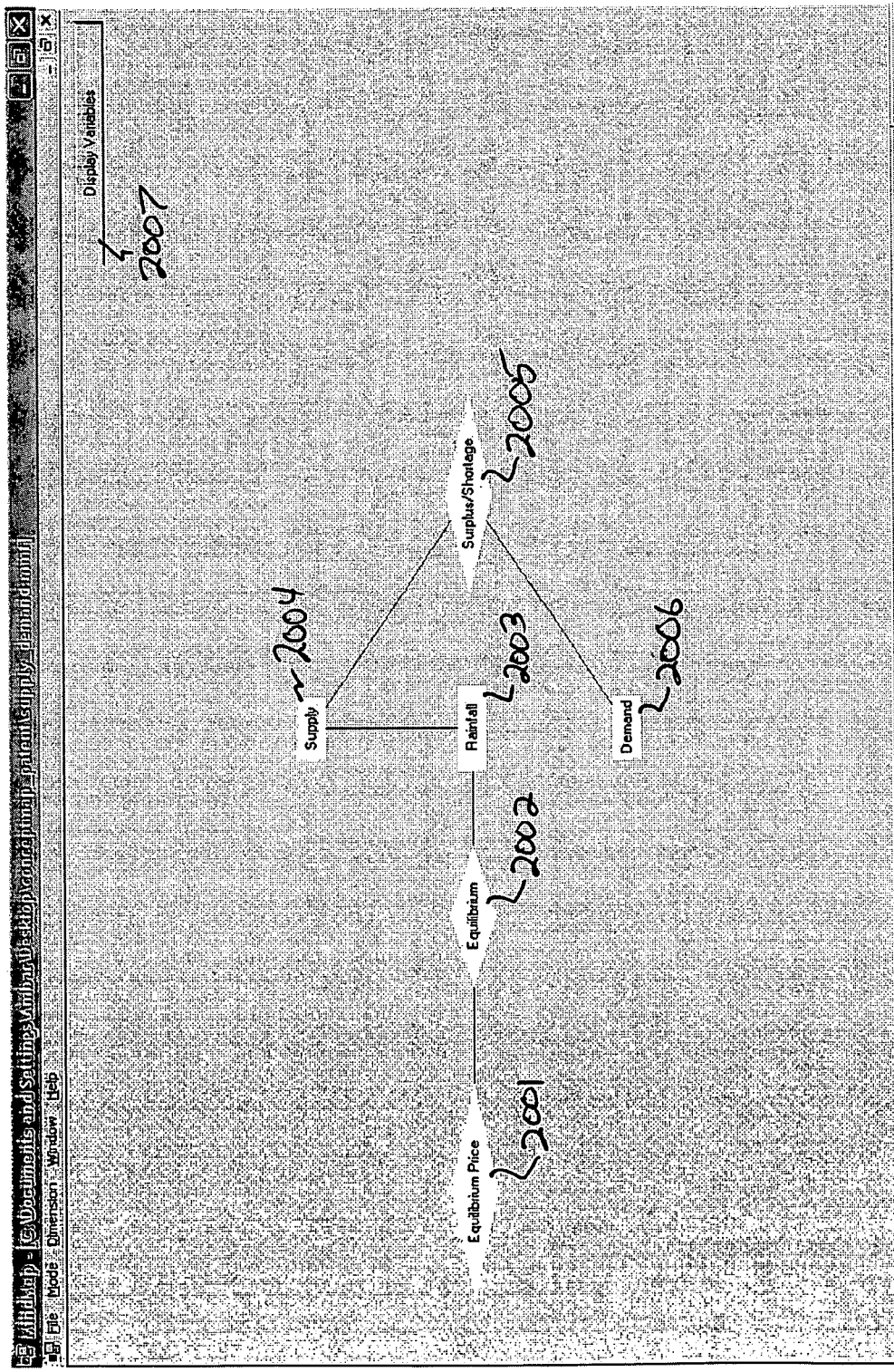
FIG. 20 depicts a screen shot 2000 displaying a concept map possessing an equilibrium-price node 2001, equilibrium node 2002, rainfall node 2003, supply node 2004, surplus/shortage node 2005, and a demand node 2006.

The final concept map for this supply demand problem is shown in FIG. 20. To determine the surplus/shortage of wine grapes, the user enters the "rainfall" and "price" as the known variables and selects "surplus" as the desired variable. The software determines the solution path shown in FIG. 21 together with the instructions for the solution. To determine the equilibrium of wine grapes, the user enters the "rainfall" as the known variable and selects "price" as the desired variable. The software determines the solution path shown in FIG. 22 together with the instructions for the solution.

Comparison of Present Invention with Other Mindmap Software

There are a number of other Mindmap software products available, including but not limited to IdeaFisher, in the market.

Others provide a Mindmap drawing tool. In contrast, in some embodiments, the present invention provides a Mindmap using tool.

Others have a built-in dictionary that shows associative ideas. In contrast, in some embodiments, the present invention provides associative ideas that need not be searched. They are already known. For example, when one is solving a problem in electromagnetism, one already knows the ideas—Coulomb's Law, Maxwell's Laws, definition of potentials, expression for the force on a charged particle, energy, power, etc. Thus, no dictionary search is necessary.

Others have links between items on the Mindmap that are passive. In contrast, in some embodiments, the present invention provides links between items that are active, with cost/efficiency numbers associated with each.

Others have little or no numerical problem solving capability, and do not have calculators/solvers. In contrast, in some embodiments, the present invention provides an emphasis on numerical problem solving capability, with built-in FORTRAN-based solvers for number crunching. In some embodiments, VisualBasic.NET platform is used to couple VB-features with FORTRAN features. In some embodiments, the present invention uses a Leahy VB-FORTRAN interface that runs on .NET platform.

Others have a mindmap that is passive after it is built. In contrast, in some embodiments, the present invention provides a Mindmap that is only the starting point. In some embodiments, the same mindmap (say, for example, one on electromagnetics) can solve hundreds of problems. In some embodiments, a user can say, x, y, z are given, find w. In some embodiments, the program shows a path on the mindmap to get to w. In some embodiments, if there are multiple paths to w, all options are displayed, each with an associated cost/effort. In some embodiments, when a problem cannot be solved along one path the reasons are displayed and alternative paths are suggested.

FIG. 1 is a schematic of a computer system 100 containing a central processing unit (CPU) 107, connected via various buses 115 to a RAM module 108, a storage controller 106, and an I/O controller 109. The storage controller 106 is operatively connected to various types of physical medium via various buses 115. These physical medium include CDs, CD-R, CD-RWs, DVD-Rs, or DVDs using one or more optical drives 102, a disk or diskette using one or more floppy drives 103, magnetic tape using one or more tape drives 104, one or more hard drive or magnetic drives 105, and a removable storage medium (e.g., a flash memory device) using a Universal Serial Bus (USB) 101. In some embodiments, the removable storage medium includes a universal mass storage device, or USB device, that is typically inserted into a USB 101 through which data and/or applications are uploaded and/or downloaded onto the USB device (i.e., a flash memory device such as a key drive, thumb drive or some other flash memory device as is known in the art). (See *USB Complete: Everything You Need to Develop Custom USB Peripherals 2nd Edition*, by Jan Axelson, Lakeview Research, 2001.) In some embodiments, an I/O controller 109 is operatively connected to various I/O devices via various buses 115. In some embodiments, these devices include a monitor 110, which, in some embodiments, is a CRT, LCD or some other type of display. In some embodiments, a printer 111 is connected to the I/O controller. In some embodiments, these devices additionally include a keyboard 113, which, in turn, is connected to a mouse 112. In some embodiments, an Internet 114 is connected to the I/O controller via a modem, Ethernet port, or some other connection known in the art. (See *Embedded Ethernet and Internet Complete*, by Jan Axelson, Lakeview Research, 2003.) In some embodiments, a local area network (LAN), or wide area network (WAN) may be used to supplement or in lieu of an Internet 114.

In some embodiments, when information is transferred or provided over a network or another communications connection (e.g., either hardwired, wireless, or a combination of hardwired and wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (e.g., a mobile phone or Personal Digital Assistant (PDA)) where internal modules (e.g., a processor and memory) work together to perform operations on electronic data.

In some embodiments, the invention may be practiced in network computing environments with many types of computer system configurations, including hubs, routers, wireless access points (APs), wireless stations, personal computers, laptop computers, hand-held devices, multi-processor systems, microprocessor-based or programmable consumer electronics, network PCs, minicomputers, mainframe computers, mobile telephones, PDAs, pagers, and the like. The invention can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices.

In some embodiments, Internet refers to a network of networks. Such networks may use a variety of protocols for exchange of information, such as TCP/IP, UDP/IP, ATM, SNA, SDI, etc., and may be used within a variety of topologies or structures. The physical connections of the Internet and the protocols and communication procedures of the Internet (e.g., the TCP/IP protocol stack) are well known to those in the art and are collectively referenced herein as the "Transport Layers." The Transport Layers provide such connections using various protocols (TCP/IP and UDP) over private and public network infrastructures, and will be used to define the method of communication between computer systems. Access to the Internet is typically provided by Internet service providers (ISPs). Access to the Internet via a computer system is typically by way of two or more computers connected in a client-server configuration. A client device or client will be used to reference any computer system that a user may sit at, touch, or hold. A server device will be used to refer to a remotely located computing system, which may be accessed by users through a client application or device via a LAN, WAN or Internet. Users on client systems, such as the client computer systems, generally obtain access to the Internet through an ISP. Access to the Internet may facilitate transfer of information (e.g., email, text files, digital-content files, etc.) between two or more computer systems, such as the client computer system and/or a server computer system (see e.g., a web server, mail server or the like). For example, one or more of the client computer systems and/or the Web server may provide digital content (e.g., video and audio, or video, or audio) to one or more of the client computer systems and/or the Web server. Such digital content may be provided in response to a request.

In some embodiments, the concept map, as described herein, is developed using interactive software such as an integrated development environment (IDE) including, but not limited to, the Microsoft .NET Framework™, or Eclipse™, that implements computer code using an object-oriented programming language such as C#™, or C++ just to name a few. In some embodiments, Java™, Delphi™ or some other object-oriented language is used. In some embodiments, Visual Basic™ (VB) is utilized. In at least one environment, a Microsoft Windows™ operating system is used on a computer system 100 possessing at least 150 MB of hard-disk space. In some embodiments, a Linux™, UNIX or some other operating system known in the art is utilized. (See *Operating System Concepts* 7$^{th}$ Edition, by Abraham Silberschatz, Peter Baer Galvin, and Greg Gagne, John Wiley and Sons, 2004.)

In some embodiments, the solutions to one or more mathematical equations are provided by certain software modules referred to as "Solvers". In at least one embodiment, a Leahy VB-FORTRAN interface is implemented whereby a user inputs values into one or more text boxes existing in one or more forms present in one or more pop-up windows that are collectively apart of a graphical user interface (GUI). The use of text boxes in conjunction with forms, pop-up windows, and GUIs as a way to provide a user interface to solve mathematical equations is well known in the art. (See *Sam's Teach Yourself Microsoft Visual Basic .NET* 2003 (*VB .NET*) *in 24 Hours Complete Starter Kit*, by James Foxall, Sam's, 2003.) These input values, in some embodiments, correspond to certain variables in an equation. Once inputted, the FORTRAN-based Solver generates a solution for the one or more mathematical equation based upon these input values.

In some embodiments, the present invention has a built-in Solver for solving linear and non-linear equations. In some embodiments, actual numerical values are used in lieu of variables. In some embodiments, a user can enter sets of test data for the variables and collect the output to analyze the trends and patterns in the relationship among the variables. From this analysis, in some embodiments, a user can synthesize new Governing Conditions that the variables must satisfy. Using these new Governing Conditions, a user can compare, contrast, and evaluate these new Governing Conditions to the previously used Governing Conditions.

In some embodiments, the Solver module and interface is written in some type of object-oriented programming language such as the aforementioned C++, Java™ or the like. In such an embodiment, the Solver module (i.e., "Solver") is provided an interface to another module of code that calls on the Solver module to perform the above outlined mathematical calculations on one or more equations. This calling module can also, in some embodiments, be written in an object-oriented programming language. Indeed, as described below the software architecture underlying some embodiments of this invention can be implemented and written in a any number of programming languages not including VB™ or FORTRAN.

In some embodiments, various concept arrangements are traversed via paths. The advantage of utilizing one path versus another is determined, in at least one embodiment, by using a minimum-cost-path algorithm such as, for example, Dijkstra's Algorithm. (See *Computer Algorithms* 3$^{rd}$ *Edition*, by Sara Baase and Allen Van Gelder, Addison-Wesley, 2003.) The determination of the cost of an individual path is calculated through using one or more of the methods described below.

In some embodiments, a GUI in the form of a window is used to display a concept map containing, among other things, concept arrangements and possible paths linking the concepts. Associated with these possible paths are certain values describing the feasibility and efficiency of each path. Using the GUI, users are free to select one or more paths path between concepts. Through answering a series of questions, and/or performing a series of calculations, the user of the software attempts to traverse these one or more paths and is provided with an explanation of success or failure.

In some embodiments, a command-line interface is implemented such that nodes and accompanying equations, variables, paths and path distances can be inputted and/or edited to set up a concept map. Command-line interfaces are known in the art and common to some embodiments of the UNIX, Linux™, and Windows™ operating systems. (See *Linux User's Guide: Using the Command Line and Gnome With Red Hat Linux*, by Carolyn Gillay, Franklin Beedle and Associates, 2003.)

In some embodiments, individual modules of code are written in, for example, an object-orient programming language (e.g., the above disclosed C++ or Java™). In at least one embodiment, a three-tier architecture is followed such that one or more modules of code is written for each level of the architecture. In one embodiment, a module of code for a user-interface level or first tier of the architecture is implemented. In one embodiment, a module of code is written and/or implemented for a logic level, or second tier, of the architecture. In one embodiment, a module of code is written and/or implemented for a database level, or third tier, of the architecture. Once one or more modules of code are written, one or more interfaces are written such that each of these three tiers can communicate with the tier immediately above and/or below it. The use of code modules implemented in a three-tier architecture with various interface modules providing for an interface between the modules is well known in the art. (See *Building Reliable Component-Based Software Systems*, by Ivica Cronkovic and Magnus Larsson, Artech House Publishers, 2002.)

Existing Concept Map Implementations

There are many concept map software packages in the market (e.g., MindJet MindManager, SmartDraw, The Brain, and IdeaFisher). In general, these software packages provide concept map-drawing capabilities, but lack the dynamic and interactive nature of the present invention. In short, they are typically static in nature.

Some existing concept map implementations provide links between ideas/nodes, but yet do not have any specific property, concrete logic, or principle other than an association. For example, in some existing concept map implementations, the user would link "Truck" with "hauling". The link appears because a truck is capable of hauling, and for hauling you may use a truck. This is the association part. However, the user could have used a "Red Planet" instead, and the implementation would not object to such a connection. Therefore, the truck-hauling link has no uniqueness to distinguish it from nodes to which it is linked.

The present invention not only makes the link, but can also obtain a pareto-optimal solution by using the network of links with any specified starting points and end goals. Existing software only draws the concept map and uses it as a visual clue. None of the existing concept map software can provide the pareto-optimal solution delivered by the present invention.

Overview of a Concept-Mapping Implementation

In FIG. 2, a concept map 200 is shown schematically. In some embodiments, the concept map is a network of nodes connected by paths. The paths depict the relationships that exist between the variables through laws and principles, derived relationships, definitions, and sum nodes. In at least one embodiment, a Variables-1 node 201 is connected to a Law-1 node 202 via a path 206. In some embodiments, a Variable-1 node 201 is also connected to a Relation-1 node 203, and Definition-1 node 205 is connected to a Principle-1 node 204. In at least one embodiment, a Sum-1 node 207 is also connected to the map via a path. In some embodiments, the sum nodes add up the influences from various sources. For example, in the art of mechanics, the sum node may add up the forces from a spring, a damper, and gravity. In at least one embodiment, in a business context, the sum node may add up the revenues generated from various divisions of a company.

In FIG. 3, an initial concept map is shown depicting various principles, laws, variables, definitions and relationships of Newtonian Physics and their interrelationship. In some embodiments, principles, laws, variables, definitions and relationships of other scientific and non-scientific paradigms are implemented and displayed. In some embodiments, the concept map in FIG. 3 contains the following types of nodes:

Law/Principle Nodes: Newton's Laws, Impulse-Momentum Principle, and the Work-Energy Principle
Definition Nodes: Momentum, Kinetic Energy, Potential Energy, Work and Impulse
Relation Node: Kinematics
Sum Node: Sum of forces FIG. 3 depicts a screen shot 300 of a concept map. Contained within this concept map are various nodes including law/principle nodes 301, definition nodes 302, a relation node 303, and sum nodes 304 just to name a few. The interrelationship or paths between these nodes is based upon the principles that one is attempting to learn. For example, in some embodiments, one might be asked to explain the Newton's $2^{nd}$ Law node 301 in terms of the Kinematics node 303 and ultimately the Sum of Forces node 304. And again, in at least one embodiment, a user might be asked to explain the impulse-momentum-principle node 301 in terms of the momentum node 302 and an impulse node 302.

Figure 4:
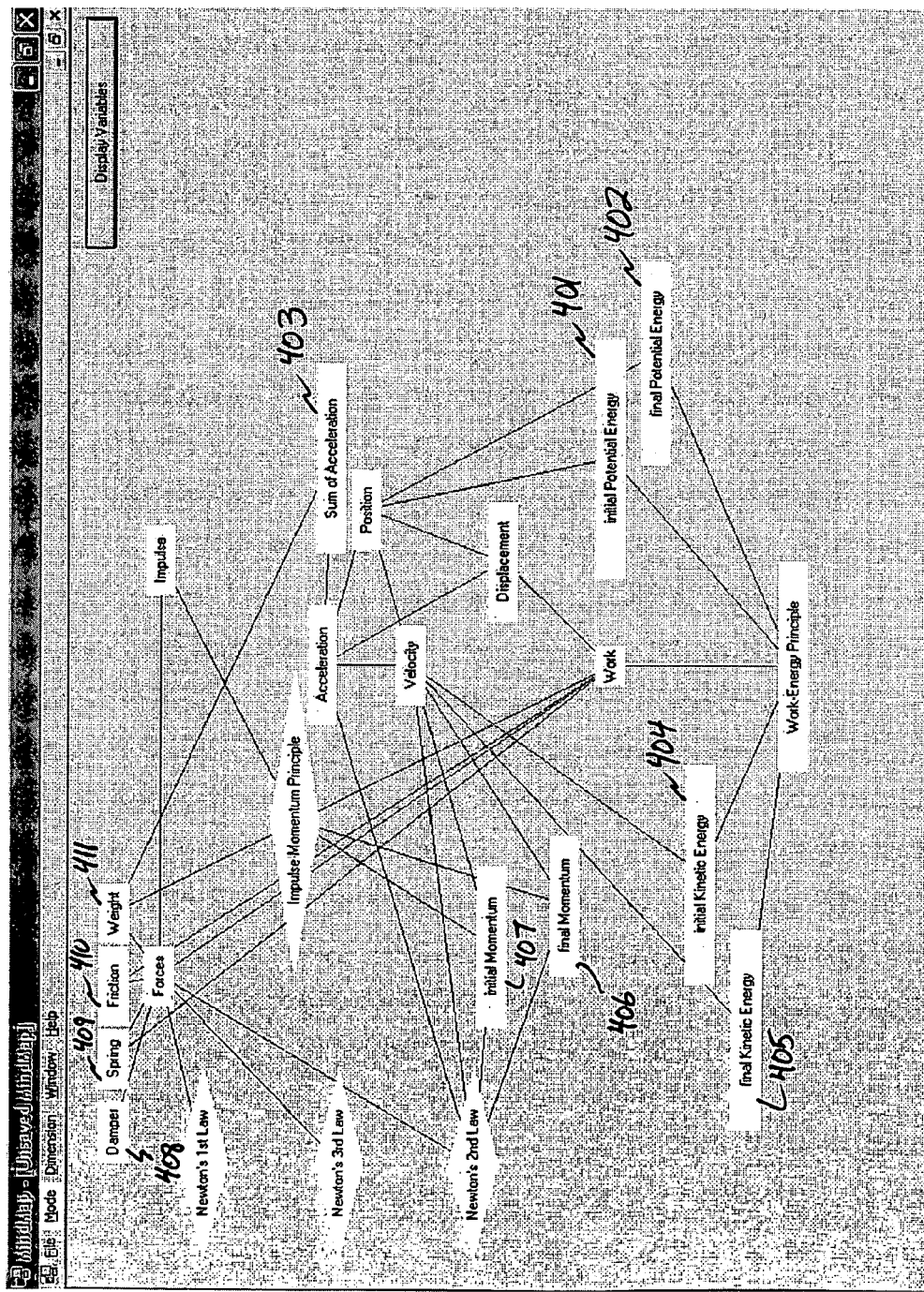
FIG. 4 depicts a screen shot 400 of an elaborate concept map.

In some embodiments, the user can use the compact concept map of FIG. 3, or switch to the elaborate concept map of FIG. 4. The elaborate map shows more detail, as some nodes are expanded into sub nodes, and all the inputs to the sum nodes are shown. The elaborate map is more complex with details. However, in some embodiments, this map remains available to user if he/she wishes to view the solution path on the detailed concept map.

FIG. 4 depicts a screen shot 400 of an elaborate concept map. As compared to the concept map disclosed in FIG. 3 above, this elaborate concept map provides more detail in the form of additional nodes. In some embodiments, the Sum of Forces node 304 is disclosed with more detail including a damper node 408, spring 409, friction node 410, and weight node 411. Similarly, in some embodiments, the momentum node 302 it broken down into an initial momentum node 407 and final-momentum node 406. In some embodiments, the additional granularity provided in this elaborate concept map allows the user to be tested on specific sub-concepts, within a more generalized concept. For example, rather than a user only being tested on momentum using a momentum node 302, the user can also be tested on the mean and use of initial momentum via an initial momentum node 407 and a final momentum through a final momentum node 406. In some embodiments, additional specific concepts, represented here as nodes, can be tested including initial kinetic energy 404, final kinetic energy 405, initial potential energy 401 and final-potential energy 402. Moreover, in some embodiments, a user's knowledge of the sum of acceleration 403 can be tested when the user is asked to relate this node to the other nodes in the elaborate concept map.

Overview of User and Developer Modules

Figure 5:
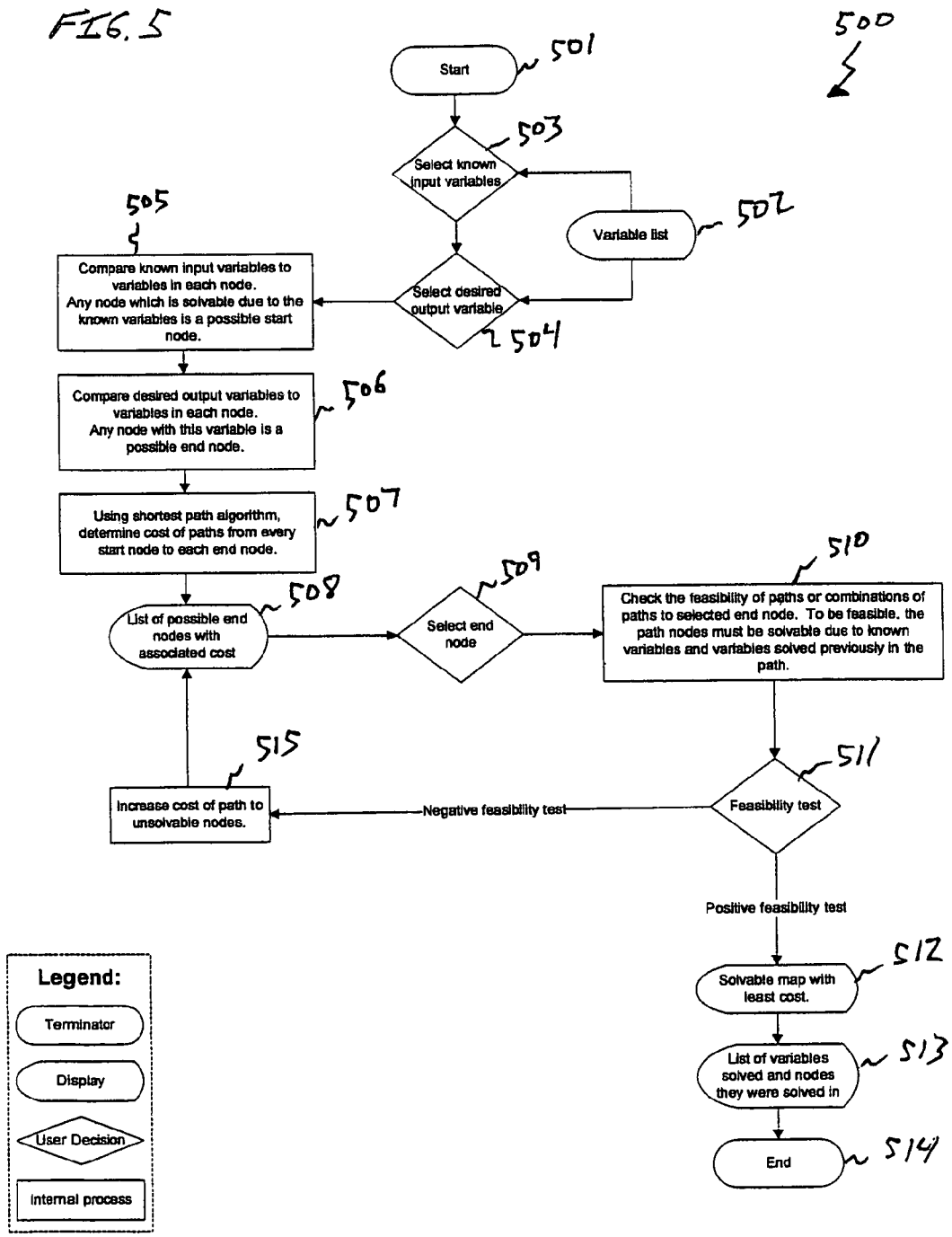
FIG. 5 is a flowchart 500 describing the steps executed in a User's Module.

The concept-mapping system of the present invention can operate in either or both of two modes. In User mode, a user solves a problem by using an existing concept map. In Developer mode, a user (i.e., a map developer) creates a new special-purpose concept map. In some embodiments, a User's Module is implemented including showing a concept map with n-number of nodes and m-number of variables. In some embodiments, each node represents either a physical principle or a definition. One mathematical equation is associated with each node, and the variables appear in these equations. Each link in the concept map has a cost associated with it. In some embodiments, this cost value is assigned to a link by the designer of the map. FIG. 5 depicts a flowchart 500 executing the following steps using the below described hypothetical definitions, mathematical equations and costs:

Step-1: User starts process 501 by posing a problem and selecting variables from two lists 502—input list 503 and output list 504. Assume that the user has chosen variables Vi, Vj, and Vk as inputs and variable is Vs as the output variable.

Step-2: The application searches the variable list associated with each node. It identifies the nodes that have the input variables (Vi, Vj, and Vk) and that appear solvable due to the known input variables. These identified nodes are labeled as the possible start nodes 505. Assume that there are two such start nodes S1 and S2.

Step-3: The application searches the variable list of each node and identifies nodes that have the output variable Vs appearing in the list. These identified nodes are labeled as the possible end nodes 506. Assume that there are two such end nodes E1 and E2.

Step-4: The application uses a shortest-path algorithm to connect the start nodes with the end nodes 507. For example, in some embodiments four such paths are possible:

P1->from S1 to E1,
P2->from S2 to E1,
P3->from S1 to E2, and
P4->from S2 to E2.

The cost of each path is computed by adding the assigned cost value for each link appearing on the path. The program calculates two cost values C1 and C2.

C1->cost for E1 being the end node=sum of costs for paths P1 and P2, and

C2->cost for E2 being the end node=sum of costs for paths P3 and P4.

Step-5: The user is given two choices: either end node E1 with cost C1, or end node E2 with cost C2. That is, the user is provided a list of possible end nodes with associated costs 508. In at least one embodiment, this step is intentionally included so that users and designers can explore various possibilities.

Step-6: Assume that the user has chosen E1 as described in step 509. The program then checks for the feasibility 510 of paths P1 and P2, which end at E1. The feasibility is checked by (i.e., defined by) the logic 511 (i.e., a feasibility test) that, for solvability, the number of unknowns, including the starting unknown plus any intermediate unknowns appearing on the path, must be equal to the available number of equations in the path. When the feasibility test is positive, the path is highlighted on the map (i.e., the screen). When more than one feasible path is found, the program picks the least expensive path 512 (i.e., the program solves for the map with the least cost). In at least one embodiment, at this stage the user can enter the "Solver" for performing multiple calculations. Once solved, a list of variables solved and nodes they were solved in are provided (see No. 513). In some embodiments, the program ends 514, or, in some embodiments, a loop or recursive movement is implemented and the user is again prompted with Step-1.

Step-7: When the feasibility test is negative, the program informs the user at which link of the path the feasibility was violated. Where the feasibility is violated, the cost associated with this path is increased to make the path to this node the least solvable node 515. The cost of these "weak links" (i.e., those deemed unfeasible) is now updated to a very large value to eliminate these from future searches for the shortest-path. Then the user is given the option of choosing E2 as the end node. The program then returns to Step-6 via a loop or recursive movement.

Figure 6:
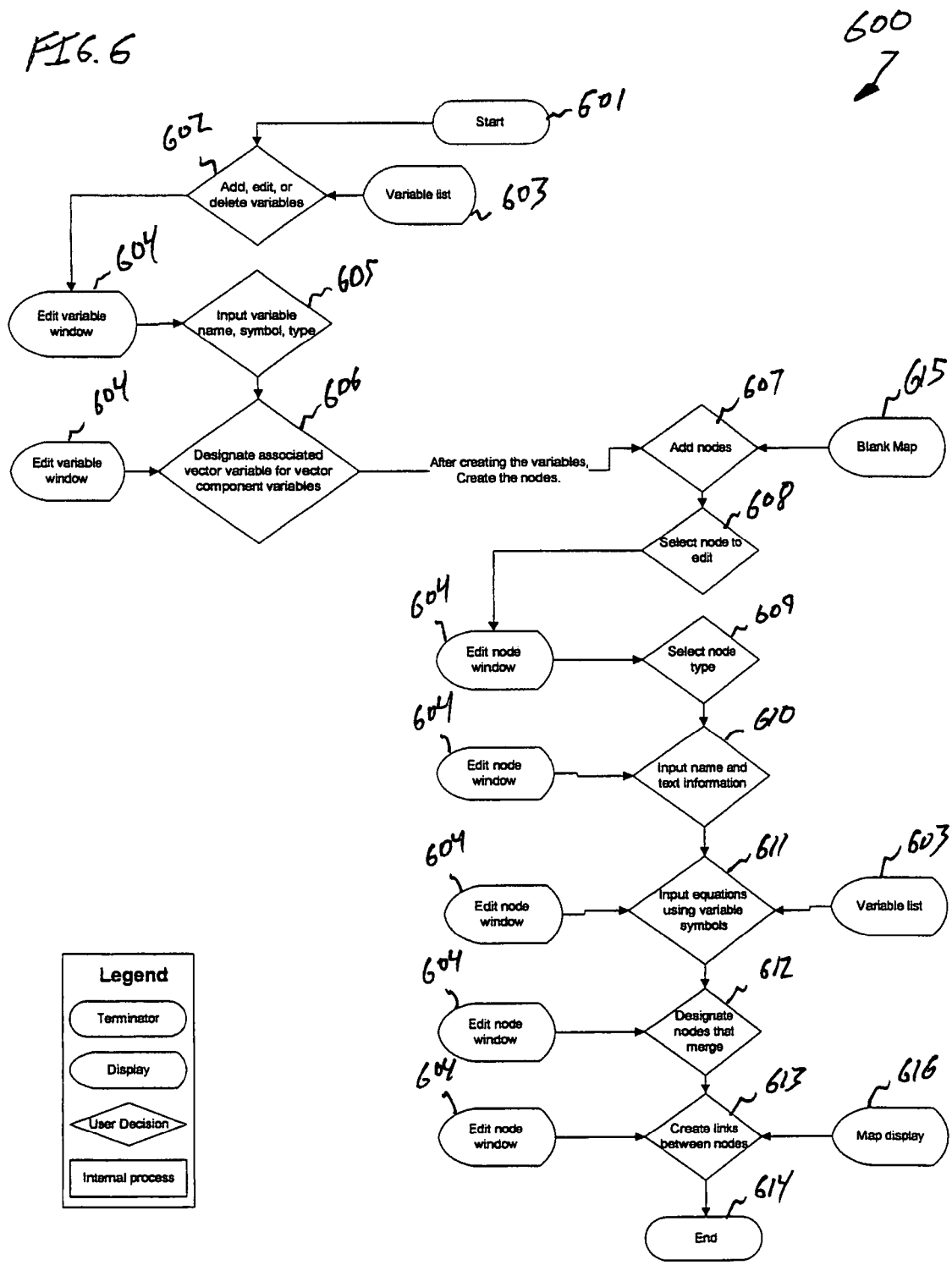
FIG. 6 is a flowchart 600 describing the steps executed in a Developer's Module.

The Developer's Module is used for building a problem or series of problems. In some embodiments, the steps involved in using the Developer's Module is depicted in a flowchart 600 and FIG. 6:

Step-1: User (i.e., developer) starts process 601 using menu commands, the developer adds, edits or deletes variable 602 from a variable list 603 in an edit variable window 604. During the course of utilizing the edit variable window 604, the developer may input a variable name, symbol or type 605.

Step-2: Once the developer adds, edits or deletes variable, if necessary, using an edit variable window 604, the developer designates the associated vector variable for vector component variables 606. After creating the variables, if necessary, the developer creates the nodes.

Step-3: The developer adds nodes 607 to an initially blank concept map 615, and moves the nodes to locations that will be clear to the user. In some embodiments, a blank node may optionally appear to the user, when the Developer's Module is first executed.

Step-4: The developer selects each node 609, in turn, from the edit node window 604 for editing. Initially, the node is designated as a particular type of node so the program can perform specific functions with the node. Consider that the developer has designated a node as a "Primary" type. This determines its shape and the cost of other nodes linking to it. Editing continues by adding the name of the node the user will see and text information 610 about the node. In some embodiments, a description, created in a different program, can also optionally be attached to the node being edited. The equation used is entered (i.e., inputted) using variable symbols 611, from a variable list 603. If the needed variables are not already in the list 603, the developer can optionally enter them during this step.

Step-5: During the editing process, the developer can also designate nodes that merge 612 with another so the user only sees one node and is not subjected to a cluttered concept map. This is necessary when there are multiple equations for the same concept, for example, in the case of the initial and final values of an object in motion.

Step-6: Either using menu commands or during the editing process, the developer adds (i.e., creates) links between the nodes 613 of the displayed concept map 616. The costs are automatically generated when using menu commands, but can be edited by the developer. At this point, the developer mode process end 614, or optionally continues using a loop or recursive movement.

Step-7: If the developer wishes to optionally consolidate the variable list for the user, it is possible to optionally edit the variables so that a single variable can stand in for multiple variables on the input and output lists.

Step-8: The concept map is optionally ready for distribution immediately after the developer has saved it.

FIG. 7 depicts a screen shot of a concept map 700 with one possible path for a solution for which a user could be tested. In at least one embodiment, depicted is a kinematics node 701 linked by a path 702 to a Newton's $2^{nd}$ Law node 703. During the course of understanding the relationship between these two nodes (i.e., Nos. 701 and 703) the user solved for an acceleration variable in the equation titled velocity 704 and for a force variable in the equation titled Newton's $2^{nd}$ Law 705. Once solved, the path between the kinematics node 701 (i.e., start node) and Newton's $2^{nd}$ Law node 703 (i.e., the end node) is highlighted. In some embodiments, it is highlighted with a distinct color (i.e., a color different than the other colors used in the concept map) or by some other means.

User Mode of a Concept-Mapping Application

In some embodiments, the user mode of the system of concept-mapping is demonstrated by taking an example from the area of mechanics. In some embodiments, FIG. 7 is a concept map containing the following types of nodes:

Law/Principle Nodes: Newton's Laws, Impulse-Momentum Principle, and the Work-Energy Principle
Definition Nodes: Momentum, Kinetic Energy, Potential Energy, Work and Impulse
Relation Node: Kinematics
Sum Node: Sum of forces In some embodiments, the uses of this map are demonstrated by solving the following problem:

A 2 KG MASS HAS A VELOCITY OF 5 M/S AT AN INITIAL INSTANT AND 10 M/S AT AN INSTANT 5 S LATER. CALCULATE THE AVERAGE FORCE THAT IS EMPLOYED ON THIS MASS DURING THE 5 S TIME INTERVAL.

In some embodiments, to pose a problem on this concept map, the user clicks a "Display Variables" button. In some embodiments, the input and variables are chosen on the pop-up windows shown in FIG. 8 and FIG. 9. In some embodiments, the window of FIG. 8 is vertically divided into two parts. The user checks the known inputs on the left-hand column and checks the outputs on the right-hand column. For the current problem, the user has chosen impulse times, mass, and velocities as input, as seen from the checked boxes in FIG. 8. Also, in some embodiments, the user might want to determine the force applied on the mass, and checks the radio button for force, as shown in FIG. 9. In some embodiments, after entering the input and output variables, the user clicks an "Accept Changes" button to obtain the concept map shown in FIG. 10. In some embodiments, the possible starting nodes for the solution of this problem are highlighted with green. In some embodiments, another color or method of signifying the solution of the problem is implemented. In at least one embodiment, the possible end points for this problem are shown on a pop-up window at the top right-hand corner. In the present example, as depicted in FIG. 10 the following nodes are disclosed:

Possible Start Nodes: Sum of Forces, Kinematics, Kinetic Energy, Momentum
Possible End Nodes: Newton's $2^{nd}$ Law, Forces, Impulse FIG. 8 depicts a screen shot 800 of a collection of input variables used for a particular set of nodes, and more specifically for finding or solving for, a path between a set of nodes. In some embodiments, a user is provided with a choice of possible known variables such as, for example, Acceleration 804, Impulse Time (final) 805, and Velocity (final) 806 just to name a few. In some embodiments, the user can select one or more of these variables using a radio button, check box or some other selection mechanism implemented via a GUI. Similarly, in some embodiments, a user is provided with a list of variables that a user may need, such as, for example, Position (final) 807, Time (final) 808. In at least one embodiment, a user may select one of these variables via a check box, radio button or some other mechanism common to a GUI. In some embodiments, once a user has made his/her selections, he/she is free to accept the selected variables via pressing an Accept Changes (Enter) button 801, or, in at least one embodiment, they are free to discard the changes via double-clicking a Discard Changes (ESC) button 802. Additionally, they are free to Add Derived Variables 803. In some embodiments, buttons 801, 802, and 803 may be replaced by some other selection mechanism such as a radio button, check box or the like.

FIG. 9 depicts a screen shot 900 of a collection of output variables used for a particular set of nodes, and more specifically for finding, or solving for, a path between a set of nodes. In some embodiments, a user is provided with a choice of possible known variables such as, for example, Force (Other) 904, just to name one. In some embodiments, the user can select one or more of these variables using a radio button, check box or some other selection mechanism implemented via a GUI. Similarly, in some embodiments, a user is provided with a list of variables that a user may need, such as, for example, Force 905, and Kinetic Energy (final) 906. In at least one embodiment, a user may select one of these variables via a check box, radio button or some other mechanism common to a GUI. In some embodiments, once a user has made his/her selections, he/she is free to accept the selected variables via pressing an Accept Changes button 901, or, in at least one embodiment, they are free to discard the changes via double-clicking a Discard Changes (ESC) button 902. Additionally, they are free to Add Basic Variables 903. In some embodiments, buttons 901, 902, and 903 may be replaced by some other selection mechanism such as a radio button, check box or the like.

In some embodiments, the costs associated with each end node are also shown in the window at top-right. At this stage it is unknown which start-node and end-node combination will solve this problem. Assuming that the user has chosen the least expensive end node (i.e., "Newton's $2^{nd}$ Law") he/she will double-click "Accept". In some embodiments, the concept map program attempts to solve the problem by searching through the four possible choices—starting a path at each of the start nodes (i.e., Sum of Forces, Kinematics, Kinetic Energy, or Momentum) and ending the path on Newton's $2^{nd}$ Law.

In this particular situation, for the solution of the problem, the software finds a successful path starting at the Kinematics node and ending at the Newton's $2^{nd}$ Law node, as shown in FIG. 10. In addition, at top right-hand corner, the software gives specific instructions for solving the problem.

FIG. 10 depicts a screen shot 1000 of the possible start and end nodes of a concept map. For example, in some embodiments, a path 1008 is highlighted between nodes on a concept map. A user may wish to use any number of starting points or nodes (i.e., Sum of Forces 1001, Momentum 1002, Kinetic Energy 1003 and Kinematics 1004) that are connected by this path 1008, to reach, in at least one embodiment, an end node such as Newton's $2^{nd}$ Law 1009. These start nodes, in some embodiments, are highlighted in some type of distinct color so as to distinguish them from other nodes. Once a user determines a start node, he/she is free to determine the end node by selecting a radio button, check box or other GUI-based mechanism. In at least one embodiment, a user may select a radio button 1007 labeled Newton's $2^{nd}$ Law. Once a selection is made, a user may either accept the selection by double-clicking a button 1005 labeled Accept (Enter), or decline to accept a selection by double-clicking a button 1006 labeled Select None (Esc). In some embodiments, a GUI-based mechanism other than a button may be implemented to accept or decline the selection.

In some embodiments, the user will select the Kinematics node 1004 by double-clicking on the node as depicted on the screen to obtain the pop-up window of FIG. 11. On this window, the user can enter the input data as, for example:

Velocity (final)=10
Velocity (initial)=5
Time (initial)=0
Time (final)=5

In some embodiments, Time (final) is set 5 to obtain an acceleration of "a=1".

FIG. 11 depicts a screen shot 1100 of a pop-up window utilized for solving numerical calculations for a particular node with certain mathematical properties. In some embodiments, a user may input data relating to a Kinematics node 1004 and, more specifically, input data to solve for velocity. In at least one embodiment, a display window, field 1101, displays the equation to be solved. In order to solve this equation, various values must be entered into the text boxes 1102 to define the variables of the equation (see above-defined values of Velocity (final), Velocity (initial), etc.). Additionally, in at least one embodiment, a user may be free to define the acceleration variable using a text box 1107. In some embodiments, once these values are entered, a user is free to: double-click a solve button 1104 to solve the equation based upon the defined variables, double-click a clear-solution button 1105 to start over, or to finish by double-clicking a finish button 1106. In some embodiments, a GUI-based mechanism other than a button may be implemented to accept or decline the selection.

In some embodiments, the user can then double-click the Newton's $2^{nd}$ Law node to obtain another pop-up window of FIG. 12. In this example, the user enters the input data as: Mass=5 to obtain force F=5. Note that the value of a=1 obtained in the first pop-up window is automatically transferred to the second pop-up window.

FIG. 12 depicts a screen shot 1200 of a pop-up window utilized for solving numerical calculations for a particular node with certain mathematical properties. In some embodiments, a user may input data relating to a Newton's $2^{nd}$ Law node and, more specifically, input data to solve for force. In at least one embodiment, a display window, field 1201, displays the equation to be solved. In order to solve this equation, various values must be entered into the text boxes 1202 to define the variables of the equation (see above defined values of force, mass, etc.). Additionally, in at least one embodiment, acceleration as a variable defined elsewhere (see e.g., F*igure* 1100 and text box 1107) is automatically displayed in text box 1203. In some embodiments, once these values are entered, a user is free to: double-click a solve button 1204 to solve the equation based upon the defined variables, double-click a clear-solution button 1205 to start over, or to finish by double-clicking a finish button 1206. In some embodiments, a GUI-based mechanism other than a button may be implemented to accept or decline the selection.

In some embodiments, by entering different values for velocities and mass, the user can further analyze the concepts of Kinematics and Newton's $2^{nd}$ Law and to discover patterns and hidden principles or regularities to improve their understanding.

In order to synthesize and create new ideas from old ones, the user can go back to the screen of FIG. 10. On this screen, instead of selecting the Newton's $2^{nd}$ Law node, explored above, the user selects either the Forces node or the Impulse node. Assume that the user has chosen the Impulse node and is presented with the screen of FIG. 13. On this screen the user discovers that there is a second method for solving the problem. That is, the problem can be solved in terms of Momentum and Impulse using the Impulse-Momentum Principle. This new solution method begins at the Momentum node and ends at the Impulse node through the Impulse-Momentum Principle node. By convention, the beginning node is colored green, the end node is colored red, and all intermediate nodes are colored blue. In some embodiments, other colors, distinct from one another, are used to distinguish the beginning node, end node and all intermediate nodes. The software also gives the instructions for obtaining the solution at top right-hand corner of the screen. By double clicking on the highlighted nodes, the user can now get pop-up windows similar to those shown in FIGS. 8 and 9. In these windows, the user can perform the numerical calculations.

FIG. 13 depicts a screen shot 1300 depicting a solution path between various nodes. In at least one embodiment, once various values have been inputted using, for example, the methods outlined in FIGS. 11 and 12, a solution path 1303 is disclosed outlining the relationship between nodes (i.e., Impulse 1302, Impulse-Momentum Principle 1304, and Momentum 1305). In some embodiments, various descriptions 1306 of the variables solved during the course of creating this solution path 1303 are displayed. In some embodiments, a Clear Paths 1301 button is implemented so allow the user to find a new solution path 1303 between nodes.

Figure 14:
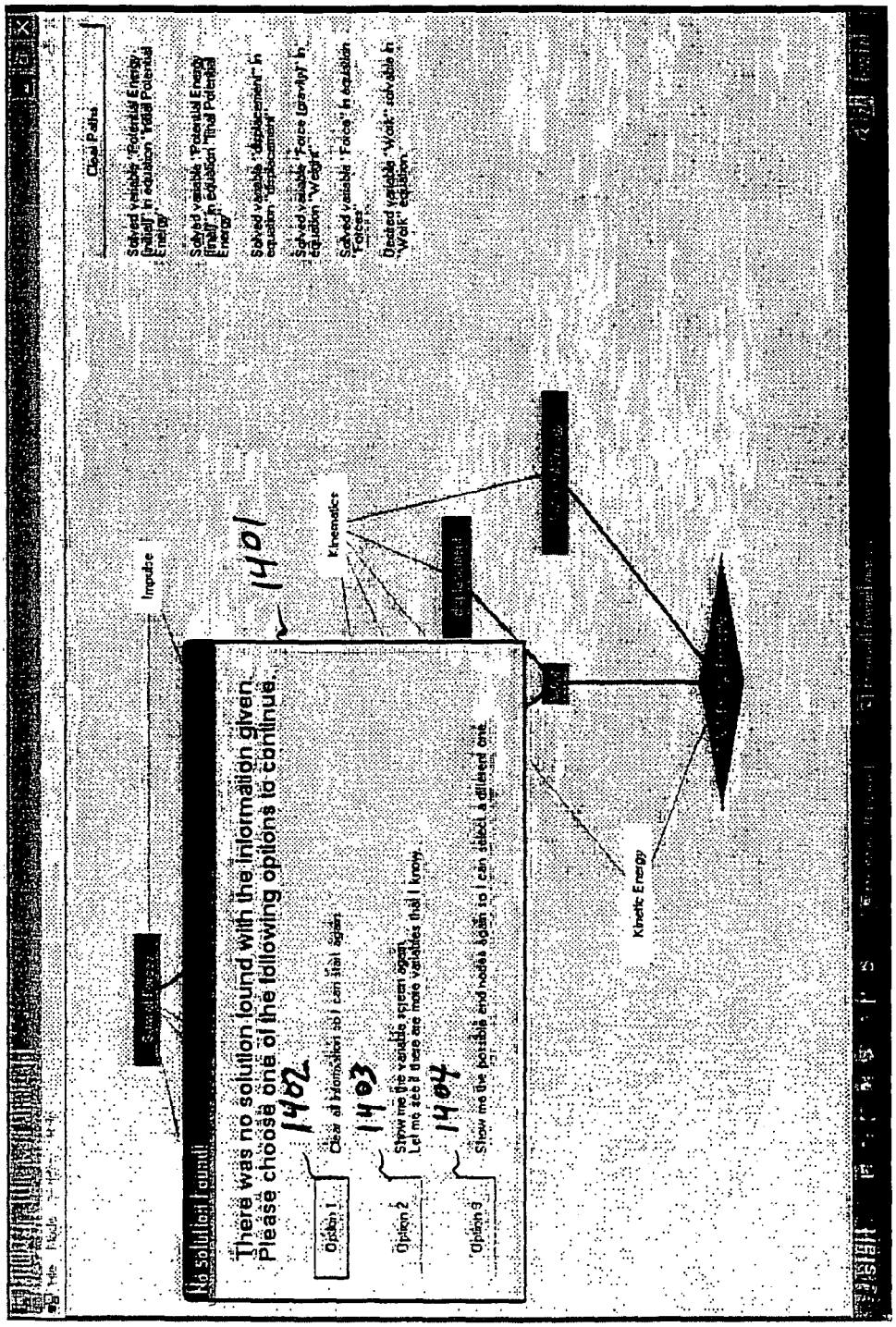
FIG. 14 depicts a screen shot 1400 where a user has failed to provide a correct solution to a problem.

FIG. 14 depicts a screen shot 1400 where a user has failed to provide a correct solution to a problem. In some embodiments, should a user provide erroneous information during the course of solving a problem, the user will be prompted via a pop-up window 1401 as to the error and the Options available to correct the error or to start over again. In some embodiment, an Option 1 button 1402 is provided that allows the user to clear all information (i.e., defined variables) and start over. In some embodiments, an Option-2 button 1403 is provided that allows the user to define more variables so as to better define a relationship between nodes. In some embodiments, an Option 3 button 1404 is provided that allows a user to select a different end node. As has been disclosed elsewhere, other GUI-based selection mechanisms may be implemented to allow the user to achieve the functionality as disclosed in screen shot 1400.

After the two paths to the solution are found and used, the user can compare and discriminate between the two sets of principles and make choices based on reasoned arguments involving the cost. For problems in mechanics, the cost is a measure of the effort expended in obtaining the solution. For business problems the cost has real monetary value.

Developer Mode of a Concept-Mapping Application

In some embodiments, the functioning of the Developer Mode of the software is demonstrated by considering a very simple problem from economics. The supply curve of wine-grapes has the equation:

$$P=7T_S+I$$

where "P" is the price per ton, "$T_S$" is tons of supply and "I" is the intercept of the supply curve. Changes in "I" push the supply curve up or down, and "I" depends on rainfall according to the equation:

$$I = \frac{4000}{R}$$

where "R" is the annual rainfall in inches, and 4000 is an assumed value. The demand curve has the equation:

$$P=600-11T_D$$

where "$T_D$" is the tons of demand, and 600 is an assumed value. The surplus "S" of wine-grapes is given by:

$$S=T_S-T_D$$

In some embodiments, by providing the above equations, a concept-map developer provides the user with the basic tool necessary to solve a specific problem, such as that described below.

In some embodiments, a user may be provided with the following sample problem. A user could be asked to: (a) Calculate the equilibrium price of wine-grapes when the annual rainfall is 25 inches, and (b) Calculate the surplus/shortage of wine-grapes when the price is fixed at $250 per ton. In some embodiments, a developer seeking to generate a concept map to test a user's understanding of the above economic concepts and mathematical equations used in answering these questions, would perform the following steps.

In some embodiments, a developer opens the software and selects "New" from the File menu at the tool bar on the top of screen to obtain the screen shown in FIG. 15.

FIG. 15 depicts a screen shot 1500, as might appear in, for example, the present application running on a computer system 100 utilizing a Windows™ operating system. The software adds an unlabeled node 1501 on the workspace.

The next step, in at least one embodiment, is for the developer to add all the variables into the concept map. In some embodiments, this is done by a right-clicking anywhere on the workspace and selecting "Add Variables" from a pop-up menu to obtain the window of FIG. 16. FIG. 16 depicts a screen shot 1600 of a pop-up window used for displaying text boxes on a form into which are inputted the name, symbol, and the type of the variable[s]. For example, in at least one embodiment, a text box 1603 is provided that allows for a user to enter the name of a variable (e.g., "Price of Grapes"). In at least one embodiment, a text box 1604 is provided that allows a user to enter the symbol for the name (e.g., "P"). In at least one embodiment, a drop-down menu 1605 is provided that allows a user to determine if the variable will be basic, derived, or some other type. Further, in at least one embodiment, a second drop-down menu 1606 is provided that allows a user to determine whether, for example, the variable will be scalar. In at least one embodiment, the user is provided with a drop-down menu 1607 for signifying whether the variable is constant. Once the variable is defined using these various text boxes and drop-down menus, the user can accept the defined variable by double-clicking either an "Ok (Enter)" button 1601, or a "Cancel (Esc)" button 1602. In some embodiments, it is through this method that all the variables in the concept are added into the program database. At the end of the variable addition process, the "Add Variable" button appears as shown in FIG. 17. Again, as has been disclosed elsewhere other GUI-implemented mechanisms may be used to input and modify data in the form of variables.

FIG. 17 depicts a screen shot 1700 disclosing a pop-up window with the names of each variable entered for a particular concept map and radio buttons corresponding to each of these variables. In some embodiments, a variable can be edited wherein a developer selects one of the variables using the corresponding radio button, and then selects one of the buttons titled "Edit Variable" 1701, "Add Variable" 1702, "Delete Variable" 1703, or "Cancel" 1704 corresponding to the particular task that they would like to perform. In the case where a developer selects "Add Variable" 1702, the user will not select a radio button 1705 corresponding to a variable, but instead will be prompted with the Add Variable window of FIG. 16.

In some embodiments, after all the variables are defined, the developer can define the node properties. By right-clicking on the node 1501 of FIG. 15 and selecting "Edit" on a pop-up menu, the developer can open the node-property window of FIG. 18. The developer enters the "Name" of the window as "Rainfall", enters a brief description of this node, and the equation relating to rainfall and the intercept of the supply curve.

Figure 18:
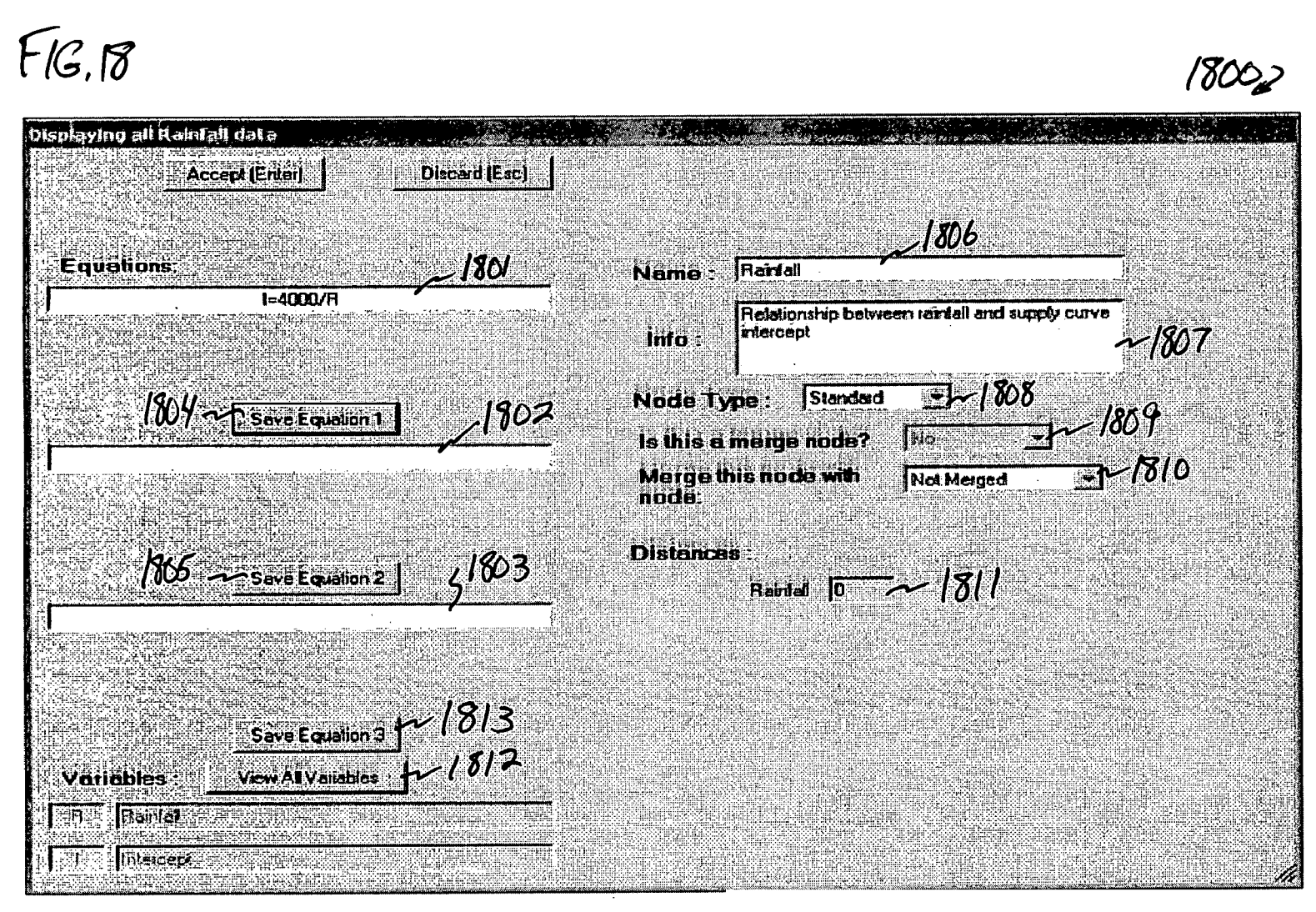

FIG. 18 is a screen shot 1800 of a pop-up window with a variety of fields for defining the characteristics of a node. Displayed in this pop-up window are text fields 1801, 1802 and 1803 representing fields into which equations can be entered and stored via activating the save buttons 1804, 1805, and 1813. These equations will, in turn, be associated with a particular node. In addition to the aforementioned text boxes, additional text boxes are present corresponding to the name 1806 of the node, and generalized information relating to the node 1807. Moreover, in some embodiments, drop-down menus are utilized to provide information relating to the node type 1808, such as whether it is a merge node 1809, and whether to merge the node that is being created with another node 1810. Additionally, a text box 1811 is provided for path or distance information. In some embodiments, a developer is provided with the option to view all variables by double-clicking a view-all-variables button 1812, which will display variables in addition to those already associated with the present node.

Additional new nodes can, in some embodiments, be added to the concept map by right-clicking on the workspace and selecting "Add" for a pop-up menu. The node properties can then be specified as described in the previous paragraph. For example, the screen for setting the properties of the Supply/Shortage node is shown in FIG. 19. On this screen, the equations for supply and demand are entered and the definition of surplus is entered as one equation. Note that, in some embodiments, the path distance between the Surplus/Shortage node and the Rainfall node is specified as 10,000. This arbitrary high value signifies that there is no direct path that connects Surplus/Shortage with Rainfall. Similarly, the distance between Surplus/Shortage node and equilibrium node is also set to 10,000.

FIG. 19 depicts a screen shot 1900 of a pop-up window with a variety of text fields, buttons and drop-down menus for entering and selecting data. Displayed in this pop-up window are text fields 1901, 1902 and 1903 representing fields into which equations can be entered and stored via activating the save buttons 1904, 1905, and 1913. These equations will, in turn, be associated with a particular node. In addition to the aforementioned text boxes, additional text boxes are present corresponding to the name 1906 of the node, and generalized information relating to the node 1907. Moreover, in some embodiments, drop-down menus are utilized to provide information relating to the node type 1908, such as whether it is a merge node 1909, and whether to merge the node that is being created with another node 1910. In some embodiments, text boxes 1911 for path distances are also provided. In some embodiments, a developer is provided with the option to view all variables by double-clicking a view-all-variables button 1912, which will display variables in addition to those already associated with the present node.

After a developer enters all the requisite node and variable information using the steps outlined above, a resulting concept map for this supply/demand problem is shown in FIG. 20. To determine the surplus/shortage of wine grapes, the user enters the "rainfall" and "price" as the known variables and selects "surplus" as the desired variable. The software determines the solution path shown in FIG. 21 together with the instructions for the solution. To determine the equilibrium of wine grapes, the user enters the "rainfall" as the known variable and selects "price" as the desired variable. The software determines the solution path shown in FIG. 22 together with the instructions for the solution.

FIG. 20 depicts a screen shot 2000 displaying a concept map possessing an Equilibrium Price node 2001, Equilibrium node 2002, Rainfall node 2003, Supply node 2004, Surplus/

Shortage node 2005 and a Demand node 2006. In some embodiments, these and other nodes are created using the steps outlined above under FIGS. 18 and 19. Additionally, present is a display-variables button 2007 that when double-clicked displays the variables utilized in setting up a particular concept map.

Figure 21:
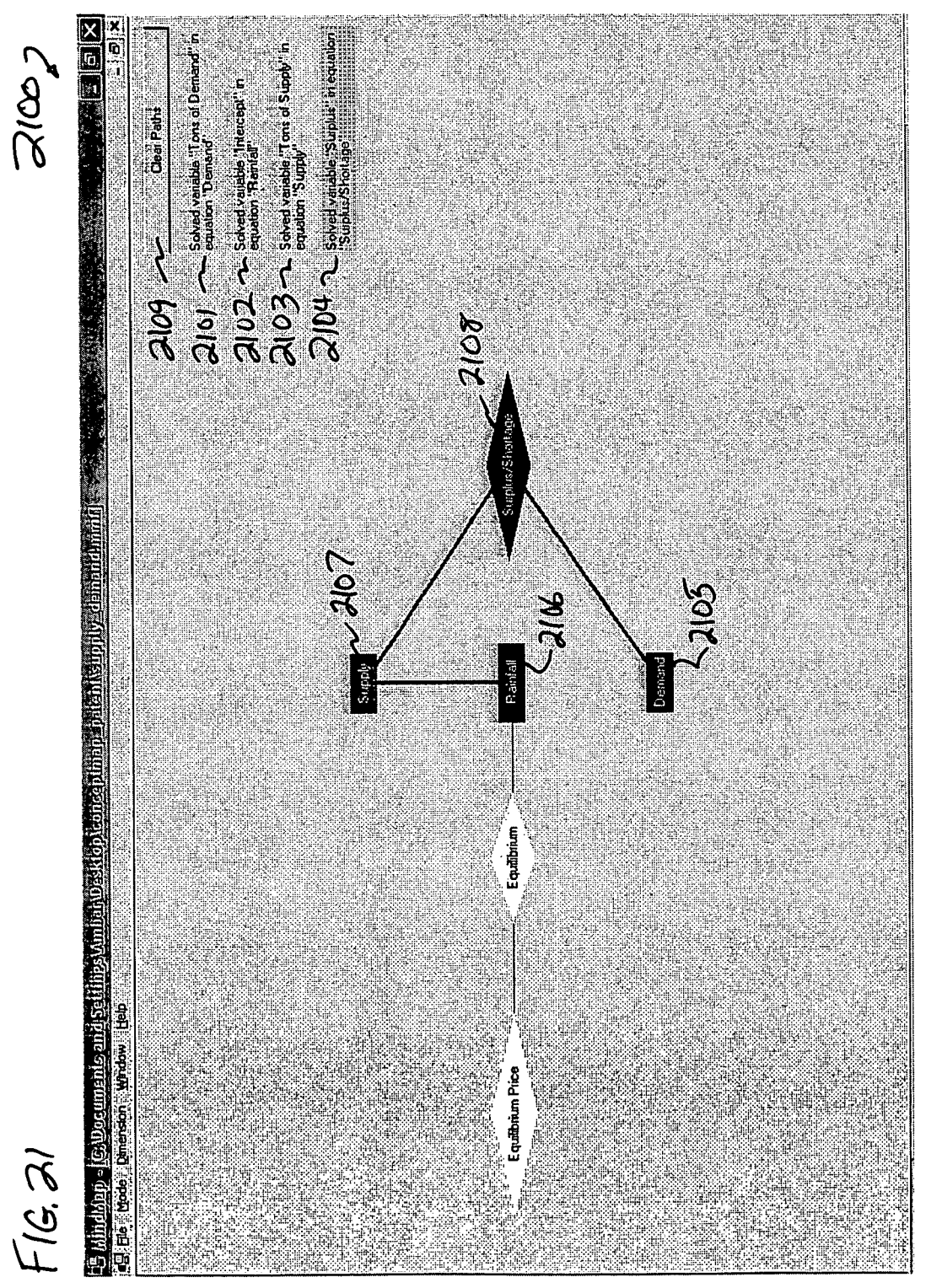

FIG. 21 depicts a screen shot 2100 displaying the path taken for solving or determining the supply curve of wine-grapes as described above. During the course of solving this problem, the user will have to solve various sub-problems, equations determining, for example, "Tons of Demand" 2101, "Intercept" 2102, "Tons of Supply" 2103, and "Surplus" 2104. In solving these sub-problems, equations the user will be able to traverse the nodes (i.e., Demand 2105, Rainfall 2106, Supply 2107, and Surplus/Shortage 2108) of the concept map. In some embodiments, a user can be provided with the option of a clear-path button 2109 allowing them to start over in their problem solving.

Figure 22:
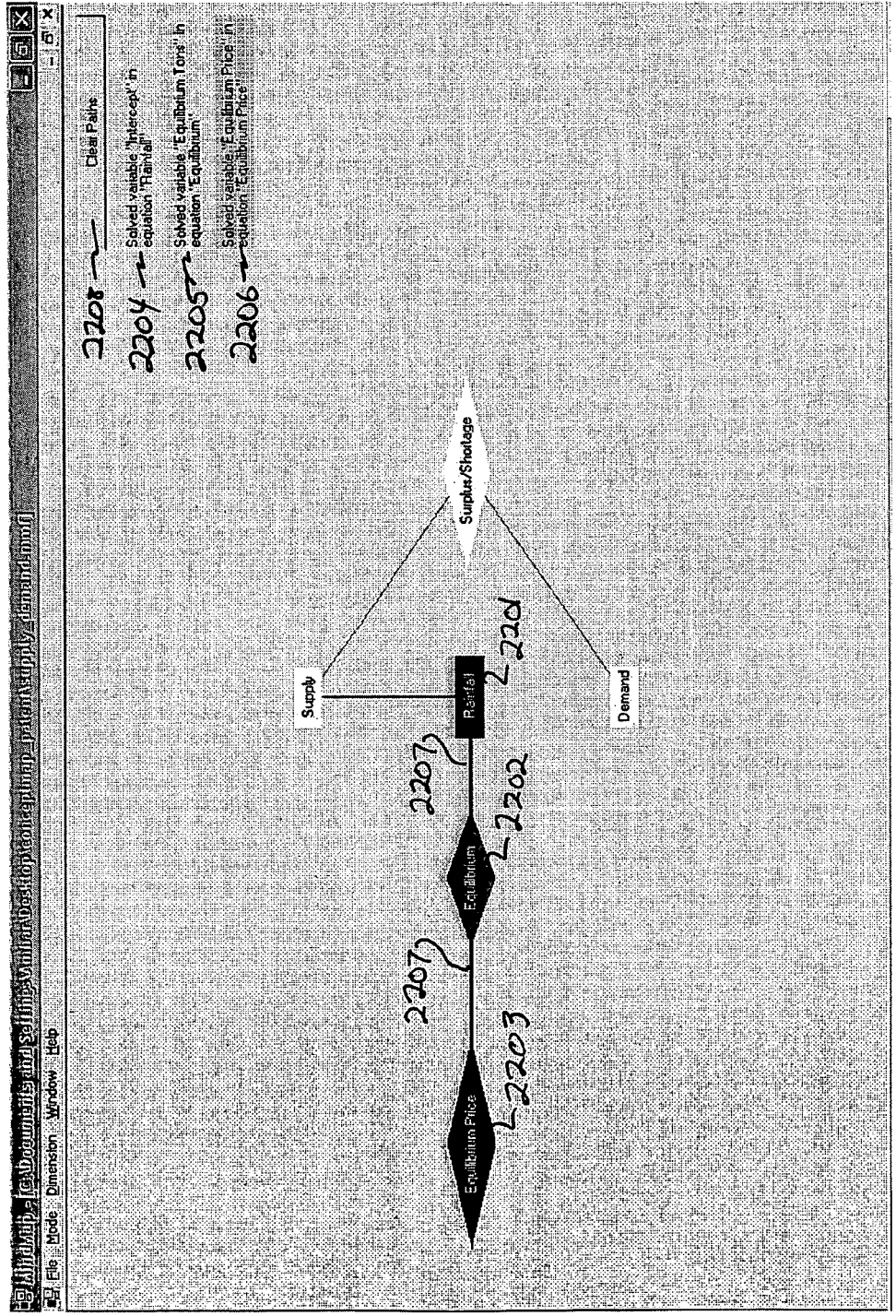
FIG. 22 depicts a screen shot 2200 disclosing the traversing of various nodes relating to rainfall 2201, equilibrium 2202, and equilibrium price of wine grapes 2203.

Similar to FIG. 21, FIG. 22 depicts a screen shot 2200 disclosing the traversing of various nodes relating to rainfall 2201, equilibrium 2202, and equilibrium price 2203. In some embodiments, as with FIG. 21, these nodes are traversed when certain mathematical variables and/or equations are solved. In some embodiments, a user can be provided with the option of a clear-path button 2208 allowing them to start over in their problem solving. Once a correct solution is provided and a solution path 2207 disclosed, a description of the various variables solved during the course of generating the solution path is displayed (see e.g., Nos. 2204, 2205, and 2206.). In some embodiments, the solution path 2207 and the nodes (i.e., Rainfall 2201, Equilibrium 2202, and Equilibrium Price 2203) along this path 2207 are distinguished via various color schemes that tend to distinguish the solution path 2207 from the various nodes, and, in at least one embodiment, the nodes from each other.

An Implementation Utilizing a Concept-Map Library Database

In some embodiments, a concept-map library will be implemented. This library will be stored into a database and will contain data describing various Law/Principle Nodes, Definition Nodes, Relation Node, and Sum Nodes as, for example, is disclosed above in FIG. 3. Associated with each of these nodes, will be various equations, and variables for the equations. Example embodiments of these equations, and variables relating to the equations, are outlined above in FIGS. 8, 9, 11, 12, just to name a few. In some embodiments, a Relational-Database Schema (RDS) is generated to model the data in the form of various nodes, equations and variables for the equations. In some embodiments, the RDS will then be normalized via certain normalization algorithms that are known into the art. (See *Fundamentals of Database Systems*, 4$^{th}$ Edition, by Ramez Elmasri and Shamkant B. Navathe, Addison Wesley, 2003.) In some embodiments, an Object-Relational-Database Schema (ORDS) will be implemented to model this data. In still other embodiments, an Extensible-Modeling Language (XML) and accompanying schemas will be used to model this data. In some embodiments, some other modeling technique will be implemented as is known in the art. In some embodiments, once one or more of these schemas (i.e., RDS, ORDS, or another schema known in the art) are normalized, a structured-query language (SQL) script will be generated to model the RDS or ORDS, and store the data into one or more databases. In some embodiments, one or more database platforms may be used for the generation of SQL script and the actual storing of the data into the database. These platforms may, in some embodiments, include MySQL™, SQLServer™, or an Oracle™ database product (e.g., 9i), just to name a few. In still other embodiments, a native database will be implemented such that the aforementioned platforms will not need to be utilized.

Once the database schema, be it RDS, ORDS or some other database schema, is implemented in SQL script on a database platform, an interface (i.e., an API as is known in the art) will allow a software implementation of the present invention to communicate with the database platform. In some embodiments, an implementation of the present invention will be enabled to request selected data from one or more databases. These requests will then retrieve/select data from the databases using, in some embodiments, SQL script. This data will be returned to the requesting software implementation of the present invention for display to the user.

Figure 23:
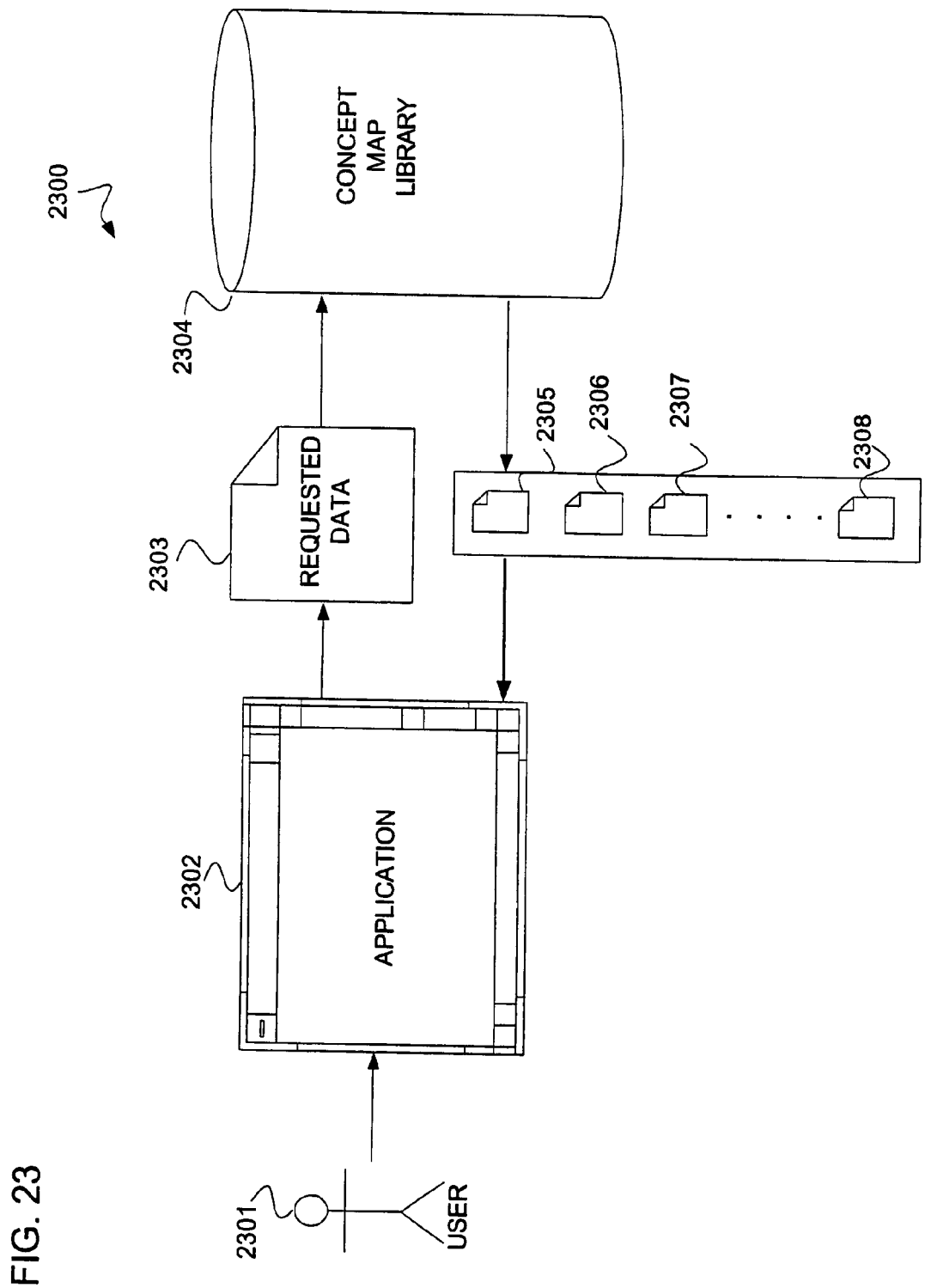
FIG. 23 is a schematic 2300 of a user using an application of the present invention that implements a concept-map library database.

FIG. 23 is a schematic 2300 of a user using an application of the present invention. As disclosed above, this application can, in some embodiments, be written in an object-oriented programming language, VB or some other programming language. In one embodiment, a user 2301 executes a software application 2302 implementing the present invention. After executing the application 2302, in some embodiments, the user 2301 requests data 2303 from one or more concept-map library databases 2304. The data request can be in the form of an entire concept map, containing nodes, equations or variables. In some embodiments, the nodes can be requested separately from the concept map. Similarly, in some embodiments, the equations and variables can be requested separately. Once a request is made, the database platform or native database application retrieves the requested data, and sends it to the application 2302. As described above, in at least one embodiment, this retrieved data can include nodes 2305, equations 2306, and variables 2307. Additional data in the form of authorship information 2308 describing the author of a particular concept table may also be included.

An Implementation Allowing Remote Access Over a Network

In some embodiments a concept-map library will be implemented that is remotely accessible by a user via an internet. In such an embodiment, one or more computer systems 100, as described above, are implemented in a server-client configuration as is commonly known in the art. (See Computer Networks: A Systems Approach, 3rd Edition, by Larry L. Peterson and Bruce S. Davie, Morgan Kaufmann, 2003.) In some embodiments, a client implementation of the application 2302 resides on client computer system 100. In some embodiments, the software utilized by the client-computer system resides on an application server, and the client utilizes a software application implementing a hyper-text-transfer-protocol (HTTP) and a GUI such as a web browser in the form of Internet Explorer™, or Mozilla™ just to name a few. In such an embodiment, the software implementation of the present invention resides in a computer-readable medium (see e.g., USB 101 for flash memory, optical drive 102 for CD, CD-R, CDRW, DVD-R, DVD-RW or DVD, floppy drive 103 using diskettes, a tape drive 104 for magnetic tape, or a hard drive 105 for magnetic disks) stored on an application server. When executed, a user may request data 2303 from one or more computer systems configured as one or more servers for the client computer system. This requested data 2303 is then retrieved from a database platform or application containing one or more concept libraries 2304. The retrieved data (e.g., Nos. 2305, 2306, 2307, 2308) is then sent to the client computer system, where it can be used to assist in developing a concept map to test a user of the application 2302.

Figure 24:
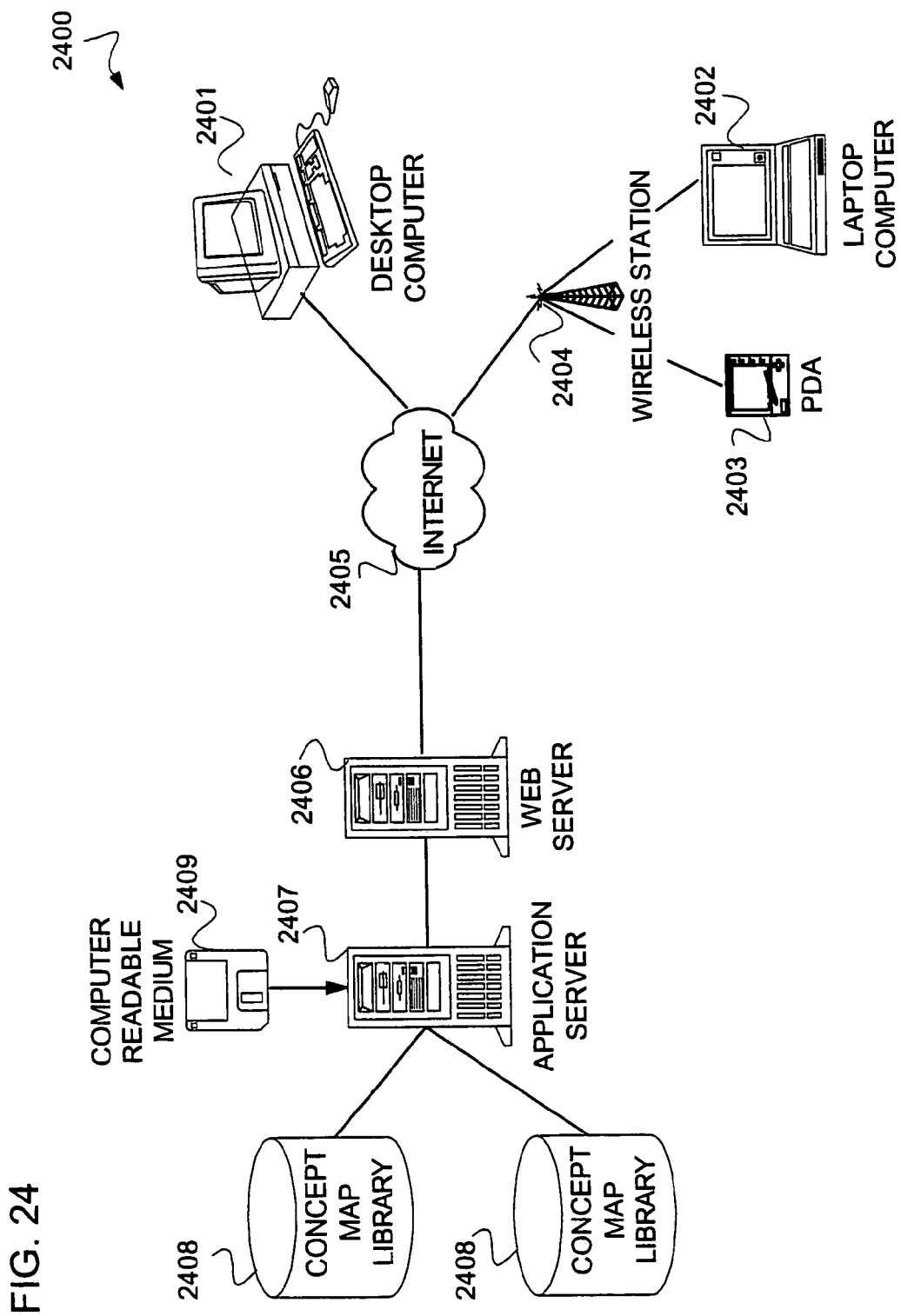
FIG. 24 is a schematic 2400 depicting a concept-map library that is accessible via an internet.

FIG. 24 is a schema 2400 depicting a concept-map library that is accessible via an internet 2405. In one embodiment, a desktop computer system 2401 using the software application 2302 is configured as a client of a second computer system 100 configured as a server. In some embodiments, the server in the client-server relationship is a web server 2406, in some embodiments it is an application server 2407, in at least one embodiment the desktop computer system 2401 is served by a web server 2406, which in turn is served by an application server 2407. In some embodiments, the application server 2407 is running a database application or platform, as is described above, that allows it to access and retrieve data 2305, 2306, 2307, and 2308 stored in one or more concept-map library databases 2408. In some embodiments, this retrieved data (i.e., Nos. 2305, 2306, 2307, 2308) is sent to a requesting desktop computer system 2401. In at least one embodiment, the desktop computer system 2401 is operatively connected to the web server 2406 and/or application server 2407 via an internet 2405. In such an embodiment, the desktop computer system 2406 is connected to an application server 2407 running a software implementation of the present invention stored on a computer readable medium 2409. In some embodiments, the desktop computer system 2401 is connected to the application server 2407 via a local area network (LAN), or wide area network (WAN). In some embodiments, a TCP/IP or UDP/IP protocol is used by both the client and server computer systems to transmit data over an internet 2405, LAN, or WAN. In some embodiments, the retrieved and/or transmitted data is formatted in XML. In some embodiments, a personal digital assistant (PDA) 2403, or laptop computer 2402 can implement the software application 2302 as a client of the above described server computer systems (i.e., Nos. 2406, 2407). In at least one embodiment, the PDA 2403 or laptop computer 2402 can request and retrieve data (e.g., Nos. 2305, 2306, 2307, 2308) using the software application 2302, or by using a software application implementing a hyper-text-transfer-protocol (HTTP) and a GUI as described above. In some embodiments, this PDA 2403, and laptop computer 2402 can access the server computer systems (i.e., Nos. 2406, 2407) via an internet 2405 over a wireless station 2404. In some embodiments, this wireless station 2404 utilizes one or more protocols, for example, from the IEEE 802.11 family of standard protocols. In some embodiments, the PDA 2403 and laptop computer 2402 access the internet via a dial-up modem, Ethernet port or the like. In some embodiments, this dial-up modem port or Ethernet port is directly connected to a land-based communication line such as, for example, a digital-subscriber line (DSL), or hybrid fiber-coaxial cable (HFC) just to name a few.

In some embodiments, the present invention provides a computer-implemented method of problem solving that includes graphically displaying a plurality of concepts, displaying dynamic links between the concepts to form a dynamic concept map, and solving a problem based on the concept map of the displayed concepts and dynamic links.

Some embodiments of the method further include posing a problem using a plurality of nodes in the concept map, selecting at least one input variable from an input variable list, selecting at least one output variable from an output variable list, searching a variable list associated with each of the nodes for each selected input variable, searching a variable list associated with each of the nodes for each selected output variable, identifying a nodes that has the input variable as a start node, identifying a nodes that has the output variables as an end node, determining a shortest path between the start node and the end node, and connecting the start node and end node using a path.

Some embodiments further include computing a cost of the path, and providing a user with a choice to elect the path.

Some embodiments further include determining a feasibility of the path and whether the feasibility is positive or negative, and if the path has a negative feasibility, then eliminating the path from consideration in the determination of the shortest path and iteratively determining a next shortest path.

In some embodiments, the method of problem solving is part of a learning intervention.

Some embodiments further include presenting to a user an initial concept map, creating an added node and adding this node to the concept map based on input from the user, obtaining descriptive information from the user and associating the descriptive information with the added node, and creating a link between the added node and another node.

In some embodiments, the descriptive information includes a node type.

In some embodiments, the descriptive information includes test information.

In some embodiments, the descriptive information includes an input equation.

Some embodiments further include obtaining input from the user designating as to whether a plurality of nodes merge.

Some embodiments further include obtaining input from the user designating a single variable to stand for multiple variables in an input or output list.

In some embodiments, the present invention provides a computer-readable medium having instructions thereon for causing a suitably programmed information-processing apparatus to perform a method of problem solving that includes graphically displaying a plurality of concepts, displaying dynamic links between the concepts to form a dynamic concept map, and solving a learning problem based on the displayed concepts and dynamic links.

In some embodiments, the instructions also cause the method to include posing a problem using a plurality of nodes in the concept map, selecting at least one input variable from an input variable list, selecting at least one output variable from an output variable list, searching a variable list associated with each of the nodes for each selected input variable, searching a variable list associated with each of the nodes for each selected output variable, identifying a nodes that has the input variable as a start node, identifying a nodes that has the output variables as an end node, determining a shortest path between the start node and the end node, and connecting the start node and end node using a path.

In some embodiments, the instructions also cause the method to include computing a cost of the path, and providing a user with a choice to elect the path.

In some embodiments, the instructions also cause the method to include determining a feasibility of the path and whether the feasibility is positive or negative, and if the path has a negative feasibility, then eliminating the path from consideration in the determination of the shortest path and iteratively determining a next shortest path.

In some embodiments, the instructions also cause the method to include presenting to a user an initial concept map, creating an added node and adding this node to the concept map based on input from the user, obtaining descriptive information from the user and associating the descriptive information with the added node, and creating a link between the added node and another node.

In some embodiments, of the computer-readable medium, the descriptive information includes a node type.

In some embodiments, of the computer-readable medium, the descriptive information includes test information.

In some embodiments, of the computer-readable medium, the descriptive information includes an input equation.

Some embodiments further include obtaining input from the user designating as to whether a plurality of nodes merge.

In some embodiments, of the computer-readable medium, the method further includes obtaining input from the user designating a single variable to stand for multiple variables in an input or output list.

In some embodiments, the present invention provides a computerized apparatus that includes means for displaying a plurality of concepts and for dynamically linking between the displayed concepts to form a dynamic concept map, and means for solving a problem based on the displayed concepts and dynamic links, and for displaying the solution obtained.

Some embodiments further include means for editing a variable. In still further embodiments, means for designating an associated vector variable is disclosed. In still further embodiments, means for posing a problem using nodes in the concept map is disclosed. In still further embodiments, means for selecting an input variable from an input variable list and for selecting an output variable from an output variable list is disclosed. In still further embodiments, means for searching a variable list associated with a node for the selected input variable is disclosed. In still further embodiments, means for searching a variable list associated with a node for the selected output variable is disclosed. In still further embodiments, means for identifying the node as a start node, if its variable list includes the input variable is disclosed. In still further embodiments, means for identifying the node as an end node, if its variable list includes the output variable is disclosed. In still further embodiments, means for determining a shortest path between the start node and the end node, and connecting the start node and end node using the path is disclosed. In still further embodiments, means for computing a cost of the path is disclosed. In still further embodiments, means for providing a user with a choice to elect the path is disclosed. In still further embodiments, means for determining a feasibility of the path and whether the feasibility is positive or negative is disclosed. In still further embodiments, means for, if the path has a negative feasibility, eliminating the path from consideration in the determination of the shortest path and iteratively determining a next shortest path is disclosed.

Some embodiments further include means for creating an added node and adding this node to a concept map, means for editing the added node wherein descriptive information is associated with the added node, means for editing the added node wherein the descriptive information includes a node type, means for editing the added node wherein the descriptive information includes a an input name and test information, means for editing the added node wherein the descriptive information includes an optional input equation and optional text information, means for editing the added node wherein the descriptive information includes a designation as to whether the nodes merge, means for creating links between the added node and another node, and means for optionally allowing a single variable to stand for multiple variables in an input or output list.

Some embodiments further include a network system that includes a server computer system, a first client computer system operatively connected to the server computer system in a client-server configuration, a first application residing on the first client computer system operable for obtaining user input information and transmitting that input information to the server computer, a second application residing the server computer system operable for receiving the input information, and based on the information, and sending concept map output information to the first client computer, wherein the first application is operable to display the concept map information.

In some embodiments, the present invention provides a computerized apparatus that includes a display output unit, a display-drive unit that causes a plurality of concepts to be displayed on the display unit, and that causes dynamic links between the concepts to be displayed to form a dynamic concept map, and a solution unit that solves a learning problem based on the displayed concepts and dynamic links, and that displays the solution obtained.

Some embodiments further include a selector that selects an input variable from an input variable list and that selects an output variable from an output variable list, a search engine that searches a variable list associated with a node for the selected input variable, and that searches a variable list associated with a node for the selected output variable, a driver that identifies the node as a start node if its variable list includes the input variable, and that identifies the node as an end node if its variable list includes the output variable, a path processor that determines a shortest path between the start node and the end node, and connects the start node and end node using the path, a calculator that computes a cost of the path, an input device that obtains from a user a choice to elect the path, a feasibility determination unit that determines a feasibility of the path and whether the feasibility is positive or negative, and an iteration loop unit that, if the path has a negative feasibility, eliminates the path from consideration in the determination of the shortest path and iteratively determines a next shortest path.

Some embodiments further include a node-addition unit that creates an added node and adds this node to a concept map, a node editor that allows the user to edit the added node with descriptive information associated with the added node, wherein the node editor obtains input information from the user as to a node type, an input name and test information, an optional input equation and optional text information, an optional designation as to whether the nodes merge, a link unit that creates a link between the added node and another node, and a variable-use unit that allows a single variable to stand for multiple variables in an input or output list.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computer-implemented method of problem solving comprising:
    accessing, with a computer, stored data representing a first concept map, wherein the first concept map includes a plurality of nodes and a plurality of paths that connect the plurality of nodes, wherein each one of the plurality of nodes has at least one equation for solving a problem using a plurality of variables, wherein the plurality of variables are associated with one or more other nodes of the first concept map, wherein the plurality of paths that connect the nodes depict the relationships that exist between the variables of the equations of the respective nodes, and wherein the plurality of variables include scalar variables and vector variables;

graphically displaying, by the computer, a plurality of concepts by displaying the nodes of the first concept map and the plurality of paths that connect the nodes;

receiving user input, into the computer, that specifies one of the nodes;

displaying, by the computer, the at least one equation of the specified node;

receiving further user input for the specified node, into the computer, that specifies input values for variables of the at least one equation of the specified node that are known variables and that selects at least one variable as an unknown variable of the at least one equation of the specified node;

selectively displaying by the computer, based on the specified node of the received user input and the specified values of known variables and the at least one unknown variable of the at least one equation of the specified node, and distinguishing at least a first path of the plurality of paths through the plurality of the nodes of the first concept map, wherein the first path can be used to solve the problem and when a plurality of the paths that connect the nodes can be used to solve the problem then displaying and distinguishing the plurality of the paths that connect the nodes that can be used to solve the problem; and solving the problem by the computer to determine a value for the at least one unknown variable based on the user input and the first concept map of the displayed concepts and the first path.

2. The method of claim 1, wherein
the receiving user input that specifies the plurality of known variables includes receiving user input for selecting at least one input variable from an input variable list; and
the receiving user input that specifies the at least one unknown variable includes receiving user input for selecting at least one output variable from an output variable list;
the method further comprising:
searching a variable list associated with each of the plurality of nodes for each selected input variable;
searching a variable list associated with each of the nodes for each selected output variable;
identifying one or more nodes that have the input variable as start nodes;
identifying one or more nodes that have the output variables as end nodes; and
determining a shortest path between the start node and the end node, and connecting the start node and end node using the determined shortest path.

3. The method of claim 2, further comprising:
computing a cost of the shortest path; and
providing a user with a choice to elect the shortest path.

4. The method of claim 2, further comprising:
determining a feasibility of the shortest path and whether the feasibility is negative; and
if the shortest path has a negative feasibility, then eliminating the shortest path from consideration in the determination of the shortest path and iteratively determining a next shortest path.

5. The method of claim 1, wherein the method of problem solving is part of a learning intervention.

6. The method of claim 1, further comprising:
presenting to a user the first concept map;
creating an added node and adding this added node to the first concept map based on input from the user;
entering equations for the added node based on user input;
obtaining descriptive information from the user and associating the descriptive information with the added node; and
creating a link between the added node and another node.

7. The method of claim 6, wherein the descriptive information includes a node type.

8. The method of claim 6, wherein the descriptive information includes test information.

9. The method of claim 6, wherein the descriptive information includes an input equation.

10. The method of claim 6, further comprising obtaining input from the user designating as to whether a plurality of nodes merge.

11. The method of claim 6, further comprising obtaining input from the user designating a single variable to stand for multiple variables in an input or output list.

12. The method of claim 1, further comprising evaluating an efficiency of the solving of the problem.

13. A non-transitory computer-readable medium having stored instructions thereon for causing a suitably programmed information-processing apparatus to perform a computer-implemented method of problem solving comprising:
accessing stored data representing a first concept map, wherein the first concept map includes a plurality of nodes and a plurality of paths that connect the plurality of nodes, wherein each one of the plurality of nodes has at least one equation for solving a problem using a plurality of variables, wherein the plurality of variables are associated with one or more other nodes of the first concept map, wherein the plurality of paths that connect the nodes depict the relationships that exist between the variables of the equations of the respective nodes, and wherein the plurality of variables include scalar variables and vector variables;
graphically displaying a plurality of concepts by displaying the nodes of the first concept map and the plurality of paths that connect the nodes;
receiving user input that specifies one of the nodes;
displaying the at least one equation of the specified node;
receiving further user input for the specified node, into the computer, that specifies input values for variables of the at least one equation of the specified node that are known variables and that selects at least one variable as an unknown variable of the at least one equation of the specified node;
selectively displaying, based on the specified node of the received user input and the specified values of known variables and the at least one unknown variable of the at least one equation of the specified node, and distinguishing at least a first path of the plurality of paths through the plurality of the nodes of the first concept map, wherein the first path can be used to solve the problem and when a plurality of the paths that connect the nodes can be used to solve the problem then displaying and distinguishing the plurality of the paths that connect the nodes that can be used to solve the problem; and
solving the problem to determine a value for the at least one unknown variable based on the user input and the first concept map of the displayed concepts and the first path.

14. The computer-readable medium of claim 13, wherein
the receiving user input that specifies the plurality of known variables includes receiving user input for selecting at least one input variable from an input variable list; and
the receiving user input that specifies the at least one unknown variable includes receiving user input for selecting at least one output variable from an output variable list;
and wherein the instructions also cause the method to include:
searching a variable list associated with each of the nodes for each selected input variable;
searching a variable list associated with each of the nodes for each selected output variable;
identifying a node that has the input variable as a start node;
identifying a nodes that has the output variables as an end node; and
determining a shortest path between the start node and the end node, and connecting the start node and end node using the determined shortest path.

15. The computer-readable medium of claim 14, wherein the instructions also cause the method to include:
computing a cost of the shortest path; and
providing a user with a choice to elect the shortest path.

16. The computer-readable medium of claim 14, wherein the instructions also cause the method to include:
determining a feasibility of the shortest path and whether the feasibility is negative; and
if the shortest path has a negative feasibility, then eliminating the shortest path from consideration in the determination of the shortest path and iteratively determining a next shortest path.

17. The computer-readable medium of claim 13, wherein the instructions also cause the method to include:
presenting to a user the first concept map;
creating an added node and adding this added node to the first concept map based on input from the user;
entering equations for the added node based on user input;
obtaining descriptive information from the user and associating the descriptive information with the added node; and
creating a link between the added node and another node.

18. The computer-readable medium of claim 17, wherein the descriptive information includes a node type.

19. The computer-readable medium of claim 17, wherein the descriptive information includes test information.

20. The computer-readable medium of claim 17, wherein the descriptive information includes an input equation.

21. The computer-readable medium of claim 17, further comprising obtaining input from the user designating as to whether a plurality of nodes merge.

22. The computer-readable medium of claim 17, further comprising obtaining input from the user designating a single variable to stand for multiple variables in an input or output list.

23. The computer-readable medium of claim 13, further comprising instructions that cause the method to include evaluating an efficiency of the solving of the problem.

24. A computerized apparatus comprising:
a non-transitory computer-readable medium;
processing means for accessing stored data on the computer-readable medium, wherein the data represent a first concept map, wherein the first concept map includes a plurality of nodes and a plurality of paths that connect the plurality of nodes, wherein each one of the plurality of nodes has at least one equation for solving a problem using a plurality of variables, wherein the plurality of variables are associated with one or more other nodes of the first concept map, wherein the plurality of paths that connect the nodes depict the relationships that exist between the variables of the equations of the respective nodes, and wherein the plurality of variables include scalar variables and vector variables;
means for receiving user input that specifies one of the nodes,
means for displaying the at least one equation of the specified node,
means for receiving further user input for the specified node, into the computer, that specifies input values for variables of the at least one equation of the specified node that are known variables and that selects at least one variable as an unknown variable of the at least one equation of the specified node;
means for displaying a plurality of concepts by displaying the plurality of nodes of the first concept map and the plurality of paths that connect the plurality of nodes and for selectively displaying, based on the specified node of the received user input and the specified values of known variables and the at least one unknown variable of the at least one equation of the specified node, and distinguishing at least a first path of the plurality of paths through the plurality of the nodes of the first concept map, wherein the first path can be used to solve the problem and when a plurality of the paths that connect the nodes can be used to solve the problem then displaying and distinguishing the plurality of the paths that connect the nodes that can be used to solve the problem; and
means for solving the problem to determine a value for the at least one unknown variable based on the user input and the first concept map of the displayed concepts and the first path, and for displaying the solution obtained.

25. The apparatus of claim 24, wherein
the means for receiving user input that specifies the plurality of known variables includes means for receiving user input for selecting at least one input variable from an input variable list; and
the means for receiving user input that specifies the at least one unknown variable includes means for receiving user input for selecting at least one output variable from an output variable list;
the apparatus further comprising:
means for searching a variable list associated with a node for the selected input variable;
means for searching a variable list associated with a node for the selected output variable;
means for identifying the node as a start node if its variable list includes the input variable;
means for identifying the node as an end node if its variable list includes the output variable;
means for determining a shortest path between the start node and the end node, and connecting the start node and end node using the shortest path;
means for computing a cost of the shortest path;
means for providing a user with a choice to elect the shortest path;
means for determining a feasibility of the shortest path and whether the feasibility is negative; and
means for, if the shortest path has a negative feasibility, eliminating the shortest path from consideration in the determination of the shortest path and iteratively determining a next shortest path.

26. The apparatus of claim 24, further comprising:
means for editing a variable;
means for designating an associated vector variable;

means for creating an added node and adding this node to the first concept map;

means for entering equations for the added node based on user input;

means for editing the added node wherein descriptive information is associated with the added node;

means for editing the added node wherein the descriptive information includes a node type;

means for editing the added node wherein the descriptive information includes an input name and test information;

means for editing the added node wherein the descriptive information includes an optional input equation and optional text information;

means for editing the added node wherein the descriptive information includes a designation as to whether the nodes merge;

means for creating links between the added node and another node; and means for optionally allowing a single variable to stand for multiple variables in an input or output list.

27. The apparatus of claim 24, further comprising:
a network system that includes:
a server computer system;
a first client computer system operatively connected to the server computer system in a client-server configuration;
a first application residing on the first client computer system operable for obtaining user input information and transmitting that input information to the server computer; and
a second application residing the server computer system operable for receiving the input information, and based on the information, sending concept map output information to the first client computer;
wherein the first application is operable to display the concept map information.

28. The method of claim 24, further comprising means for evaluating an efficiency of the solving of the problem.

29. A computerized apparatus comprising:
a computer, wherein the computer includes:
a storage controller unit that provides stored data representing a first concept map, wherein the first concept map includes a plurality of nodes and a plurality of paths that connect the nodes, wherein each one of the plurality of nodes has at least one equation for solving a problem using a plurality of variables, wherein the plurality of variables are associated with one or more other nodes of the first concept map, wherein the plurality of paths that connect the nodes depict the relationships that exist between the variables of the equations of the respective nodes, and wherein the plurality of variables include scalar variables and vector variables;
a receiving unit that receives user input that specifies one of the nodes;
a display unit that displays the at least one equation of the specified node;
wherein the receiving unit receives further user input for the specified node, into the computer, that specifies input values for variables of the at least one equation of the specified node that are known variables and that selects at least one variable as an unknown variable of the at least one equation of the specified node;
a display-drive unit that causes a plurality of concepts to be displayed on the display unit by displaying the plurality of nodes of the first concept map and the plurality of paths that connect the plurality of nodes, and that causes, based on the specified node of the received user input and the specified values of known variables and the at least one unknown variable of the at least one equation of the specified node, and distinguishing at least a first path of the plurality of paths through the plurality of the nodes of the first concept map, wherein the first path can be used to solve the problem and when a plurality of the paths that connect the nodes can be used to solve the problem then the display-drive unit causes the plurality of the paths that connect the nodes that can be used to solve the problem to be displayed and distinguished; and
a solution unit that solves the problem to determine a value for the at least one unknown variable based on the user input and the first concept map of the displayed concepts and the first path, and that displays the solution obtained.

30. The apparatus of claim 29, wherein:
the receiving unit includes a selector that selects an input variable from an input variable list based on the user input that specifies the plurality of known variables and that selects an output variable from an output variable list based on the user input that specifies the at least one unknown variable;
a search engine that searches a variable list associated with each of the plurality of nodes for the selected input variable, and that searches a variable list associated with each of the plurality of nodes for the selected output variable;
a driver that identifies one of the plurality of nodes as a start node if its variable list includes the input variable, and that identifies one of the plurality of nodes as an end node if its variable list includes the output variable;
a path processor that determines a shortest path between the start node and the end node, and connects the start node and end node using the determined shortest path;
a calculator that computes a cost of the shortest path;
an input device that obtains from a user a choice to elect the shortest path;
a feasibility determination unit that determines a feasibility of the shortest path and whether the feasibility is negative; and
an iteration loop unit that, if the shortest path has a negative feasibility, eliminates the shortest path from consideration in the determination of the shortest path and iteratively determines a next shortest path.

31. The apparatus of claim 29, further comprising:
a node-addition unit that creates an added node and adds this added node to the first concept map;
a node-equation unit that enters equations for the added node based on user input;
a node editor that allows the user to edit the added node with descriptive information associated with the added node, wherein the node editor obtains input information from the user as to a node type, an input name and test information, an optional input equation and optional text information, an optional designation as to whether the nodes merge;
a link unit that creates a link between the added node and another node; and
a variable-use unit that allows a single variable to stand for multiple variables in an input or output list.

32. The apparatus of claim 29, wherein the solution unit also evaluates an efficiency of a solution procedure.

* * * * *